US006856782B2

(12) United States Patent
Takahata et al.

(10) Patent No.: US 6,856,782 B2
(45) Date of Patent: Feb. 15, 2005

(54) INTERMEDIATE TRANSFER UNIT HAVING A PRIMARY AND A SECONDARY TRANSFER MEMBER

(75) Inventors: Toshiya Takahata, Nagano (JP); Akira Kubota, Nagano (JP); Tatsuro Osawa, Nagano (JP); Nobumasa Abe, Nagano (JP); Takehiko Okamura, Nagano (JP); Hiroshi Ito, Nagano (JP); Tahei Ishiwatari, Nagano (JP); Toshihiko Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 10/225,535

(22) Filed: Aug. 22, 2002

(65) Prior Publication Data

US 2003/0077091 A1 Apr. 24, 2003

Related U.S. Application Data

(60) Continuation of application No. 10/138,430, filed on May 6, 2002, which is a division of application No. 09/716,969, filed on Nov. 22, 2000, now Pat. No. 6,408,158, which is a continuation of application No. 09/199,493, filed on Nov. 25, 1998, now Pat. No. 6,223,015, which is a division of application No. 09/016,785, filed on Jan. 30, 1998, now Pat. No. 6,173,139.

(30) Foreign Application Priority Data

| | | |
|---|---|---|
| Jan. 31, 1997 | (JP) | 9-32679 |
| Jan. 31, 1997 | (JP) | 9-32996 |
| Feb. 28, 1997 | (JP) | 9-46461 |
| Feb. 28, 1997 | (JP) | 9-46462 |
| Feb. 28, 1997 | (JP) | 9-46463 |
| Feb. 28, 1997 | (JP) | 9-46464 |
| Feb. 28, 1997 | (JP) | 9-46465 |
| Feb. 28, 1997 | (JP) | 9-46466 |
| Feb. 28, 1997 | (JP) | 9-46474 |
| Feb. 28, 1997 | (JP) | 9-46475 |
| Feb. 28, 1997 | (JP) | 9-46476 |
| Feb. 28, 1997 | (JP) | 9-46477 |
| Feb. 28, 1997 | (JP) | 9-46478 |

(51) Int. Cl.[7] ................................................ G03B 15/16
(52) U.S. Cl. ....................................... 399/302; 399/308
(58) Field of Search ................................. 399/302, 308

(56) References Cited

U.S. PATENT DOCUMENTS

| | | | |
|---|---|---|---|
| 4,774,545 | A | 9/1988 | Tsuji et al. |
| 4,873,554 | A | 10/1989 | Greco, Jr. |
| 5,023,541 | A | 6/1991 | Yosinski |
| 5,040,028 | A | 8/1991 | Kamimura et al. |

(List continued on next page.)

FOREIGN PATENT DOCUMENTS

| | | |
|---|---|---|
| EP | 0 729 075 A2 | 8/1996 |
| EP | 0 729 075 A3 | 1/1997 |

(List continued on next page.)

OTHER PUBLICATIONS

Patent Abstracts of Japan, JP 407306544, Takagi et al., Nov. 21, 1995.

(List continued on next page.)

*Primary Examiner*—Quana Grainger
(74) *Attorney, Agent, or Firm*—Sughrue Mion, PLLC

(57) ABSTRACT

A recording medium carrier system of an image forming apparatus is constituted by independent units as a paper supply cassette, a paper feed unit, a transfer unit, a fixing unit, and a paper ejecting unit. An intermediate transfer unit in the transfer unit is provided with an intermediate transfer belt to which a toner image formed on a photoconductive drum is primarily transferred at a primary transfer position and which secondarily transfers the toner image on a recording medium at a secondary transfer position, and a driving roller for circulating the intermediate transfer belt. The primary transfer position is arranged close to the driving roller.

2 Claims, 9 Drawing Sheets

U.S. PATENT DOCUMENTS

| | | | |
|---|---|---|---|
| 5,075,731 | A | 12/1991 | Kamimura et al. |
| 5,119,146 | A | 6/1992 | Nobumori et al. |
| 5,189,478 | A | 2/1993 | Hara et al. |
| 5,208,612 | A | 5/1993 | Obu et al. |
| 5,231,457 | A | 7/1993 | Nakano et al. |
| 5,253,028 | A | 10/1993 | Gonda et al. |
| 5,255,061 | A | 10/1993 | Matsuura et al. |
| 5,285,244 | A | 2/1994 | Bujese |
| 5,351,114 | A | 9/1994 | Matsuno |
| 5,510,886 | A | 4/1996 | Sugimoto et al. |
| 5,534,981 | A | 7/1996 | Ohno et al. |
| 5,671,464 | A | 9/1997 | Kubota |
| 5,689,771 | A | 11/1997 | Sato et al. |
| 5,714,290 | A | 2/1998 | Yu et al. |
| 5,729,816 | A | 3/1998 | Matsumoto et al. |
| 5,797,068 | A | 8/1998 | Otsuki et al. |
| 5,822,648 | A | 10/1998 | Mohri |
| 5,905,934 | A | 5/1999 | Koshimizu |
| 5,933,697 | A | 8/1999 | Onodera et al. |
| 5,937,261 | A | 8/1999 | Shirakawa et al. |
| 6,064,849 | A | 5/2000 | Honda et al. |

FOREIGN PATENT DOCUMENTS

| | | | |
|---|---|---|---|
| JP | 54-97031 | A | 7/1979 |
| JP | 58-149745 | U | 10/1983 |
| JP | 63-121062 | A | 5/1988 |
| JP | 63-194345 | U | 12/1988 |
| JP | 2-119448 | U | 9/1990 |
| JP | 3-249671 | | 11/1991 |
| JP | 4-43381 | A | 2/1992 |
| JP | 4-70762 | A | 3/1992 |
| JP | 4-237075 | A | 8/1992 |
| JP | 4-112258 | U | 9/1992 |
| JP | 5-270078 | | 10/1993 |
| JP | 6-167827 | | 6/1994 |
| JP | 6-295132 | | 10/1994 |
| JP | 6-332235 | | 12/1994 |
| JP | 7-181815 | A | 7/1995 |
| JP | 7-209952 | A | 8/1995 |
| JP | 7-306544 | | 11/1995 |
| JP | 8-6350 | A | 1/1996 |
| JP | 8-22161 | A | 1/1996 |
| JP | 8-44220 | A | 2/1996 |
| JP | 08-036316 | | 2/1996 |
| JP | 8-63000 | | 3/1996 |
| JP | 8-137183 | A | 5/1996 |
| JP | 8-160759 | | 6/1996 |
| JP | 8-194392 | | 7/1996 |
| JP | 8-202172 | | 8/1996 |
| JP | 8-211757 | A | 8/1996 |
| JP | 8-240959 | A | 9/1996 |
| JP | 8-286584 | | 11/1996 |
| JP | 8-314284 | | 11/1996 |
| JP | 8-328306 | | 12/1996 |
| JP | 8-334989 | A | 12/1996 |
| JP | 9-48533 | | 2/1997 |
| JP | 09-044007 | | 2/1997 |
| JP | 9-68876 | | 3/1997 |
| JP | 9-86754 | | 3/1997 |
| JP | 9-90777 | | 4/1997 |
| JP | 9-138595 | | 5/1997 |
| JP | 9-160395 | | 6/1997 |
| JP | 10-326068 | | 12/1998 |

OTHER PUBLICATIONS

Patent Abstracts of Japan, JP 408063000, Handa et al., Mar. 8, 1996.

Patent Abstracts of Japan, JP 406167827, Mariko et al., Jun. 14, 1994.

Patent Abstracts of Japan, JP 408202172A, Fukuda et al., Aug. 9, 1996.

Patent Abstracts of Japan, JP 406332235, Yoshitake Shimizu, Dec. 2, 1995.

Patent Abstracts of Japan, JP 08160759, Takashi et al., Jun. 21, 1996.

Patent Abstracts of Japan, JP 06295132, Takeo et al., Oct. 21, 1992.

Patent Abstracts of Japan, JP vol. 1998, No. 7, Mar. 31, 1998 (JP 8–248827).

Patent Abstracts of Japan vol. 1997, No. 05, May 30, 1997 & JP 09 015999 A (Seiko Epson Corp) Jan. 17, 1997.

Patent Abstracts of Japan vol. 1997, No. 03, Mar. 31, 1997 & JP 08 286528 A (Canon Inc.) Nov. 1, 1996.

Patent Abstracts of Japan vol. 1995, No. 04, May 31, 1995 & JP 07 020731 A (Matsushita Electric Ind. Co.).

Patent Abstracts of Japan vol. 017, No. 332 (P–1562), Jun. 23, 1993 & JP 05 040418 A (Canon Inc.).

Patent Abstracts of Japan vol. 005, No. 126 Aug. 14, 1981 & JP 56 064367 A (Minolta Camera Co. Ltd).

Patent Abstracts of Japan vol. 018, No. 244 May 10, 1994 & JP 06 027838 A (Fuji Xerox Co., Ltd).

FIG. 6(a)

MEASUREMENT OF PARTICLE SIZE DISTRIBUTION

| | VOLUME | | | | NUMBER | | | |
|---|---|---|---|---|---|---|---|---|
| CALCULATED VALUE | 25.4 μ ↑ : 0<br>6.35 μ ↓ : 22.07<br>25.4 μ ↑ : 0<br>32.0 μ ↓ : 100<br>KURTOSIS : .8295<br>SKEWNESS : -.5318 | | MEAN : 7.750<br>25% : 6.466<br>50% : 7.556<br>75% : 8.937<br>CV% : 23.09<br>SD μ : 1.789 | | 25.4 μ ↑ : .001<br>6.35 μ ↓ : 49.84<br>25.4 μ ↑ : 0<br>32.0 μ ↓ : 100<br>KURTOSIS : .3395<br>SKEWNESS : -.0423 | | MEAN : 6.454<br>25% : 5.18<br>50% : 6.357<br>75% : 7.596<br>CV% : 28.17<br>SD μ : 1.818 | |
| | CH | RANGE μm | DIE % | CUM % | DIF N | COM N | DIF % | CUM % |
| RESULT OF MEASUREMENT | 1 | 1.26~1.59 | 0.0 | 0.0 | 0 | 0 | 0.0 | 0.0 |
| | 2 | 1.59~2.00 | 0.0 | 0.0 | 0 | 0 | 0.0 | 0.0 |
| | 3 | 2.00~2.52 | 0.0 | 0.0 | 865 | 865 | 1.7 | 1.7 |
| | 4 | 2.52~3.17 | 0.0 | 0.0 | 991 | 1856 | 2.0 | 3.7 |
| | 5 | 3.17~4.00 | 0.5 | 0.5 | 1884 | 3740 | 3.8 | 7.5 |
| | 6 | 4.00~5.04 | 4.5 | 5.0 | 7088 | 10828 | 14.2 | 21.7 |
| | 7 | 5.04~6.35 | 17.1 | 22.1 | 14094 | 24922 | 28.2 | 49.8 |
| | 8 | 6.35~8.00 | 37.1 | 59.1 | 16205 | 41127 | 32.4 | 82.3 |
| | 9 | 8.00~10.1 | 33.4 | 92.5 | 7958 | 49085 | 15.9 | 98.2 |
| | 10 | 10.1~12.7 | 6.7 | 99.2 | 860 | 49945 | 1.7 | 99.9 |
| | 11 | 12.7~16.0 | 0.8 | 100.0 | 52 | 49997 | 0.1 | 100.0 |
| | 12 | 16.0~20.2 | 0.0 | 100.0 | 2 | 49999 | 0.0 | 100.0 |
| | 13 | 20.2~25.4 | 0.0 | 100.0 | 0 | 49999 | 0.0 | 100.0 |
| | 14 | 25.4~32.0 | 0.0 | 100.0 | 1 | 50000 | 0.0 | 100.0 |
| | 15 | 32.0~40.3 | 0.0 | 100.0 | 0 | 50000 | 0.0 | 100.0 |
| | 16 | 40.3~50.8 | 0.0 | 100.0 | 0 | 50000 | 0.0 | 100.0 |

INTERMEDIATE TRANSFER UNIT HAVING A PRIMARY AND A SECONDARY TRANSFER MEMBER

This is a continuation of application Ser. No. 10/138,430 filed May 6, 2002, which is a divisional of application Ser. No. 09/716,969 filed Nov. 22, 2000, now U.S. Pat. No. 6,408,158 which is a continuation of application Ser. No. 09/199,493, filed Nov. 25, 1998, and issued as U.S. Pat. No. 6,223,015, which is a divisional of application Ser. No. 09/016,785, filed Jan. 30, 1998, and issued as U.S. Pat. No. 6,173,139, the disclosure of which is incorporated herein by reference.

BACKGROUND OF THE INVENTION

The present invention relates to an intermediate transfer unit used in an image formation apparatus using an electrophotographic method, such as a copying machine, a printer and a facsimile. The present invention also relates to a recording medium carrier system applied to the image formation apparatus.

As for a copying machine, a printer, a facsimile and other image formation apparatuses respectively using electrophotography, above all, an image formation apparatus using a laser beam writing device, a function for transferring and fixing a toner image while carrying a recording medium at high speed is required to make good use of the function of the writing device, and operability for allowing a simple measure for paper jam and others caused by the provision of such a function is also required.

Generally, an image formation apparatus using electrophotographic technology is provided with a photoconductive drum provided with a photosensitive layer as the peripheral face, charge means for evenly charging the peripheral surface of the photoconductive drum, exposure means for selectively exposing the peripheral surface evenly charged by the charge means to form an electrostatic latent image, developing means for applying toner as a developer to the electrostatic latent image formed by the exposure means to form a visible image (a toner image), and transfer means for transferring the toner image developed by the developing means on a transfer medium such as paper.

For transfer means for transferring a toner image developed on a photoconductive drum on a transfer medium such as paper, heretofore, there is known transfer means provided with an intermediate transfer belt to which a toner image formed on a photoconductive drum is transfered (primary transfer) and which further transfers (secondary transfer) the toner image on a recording medium, and with a driving roller for circulating the intermediate transfer belt.

As for the above prior transfer means, there is a problem that since distance between a primary transfer position and the driving roller is large, the amount of shrinkage of the intermediate transfer belt between them is increased, the travel speed of the intermediate transfer belt in the primary transfer position is unstable, and as a result, it is difficult to acquire satisfactory primary transfer.

Further, according to the above prior transfer means, there is a problem that a transfer roller is directly touched to the joint of the intermediate transfer belt, a secondary transfer roller is stained by toner accumulated in a step of the joint of the intermediate transfer belt, and toner adheres to the rear of a recording medium in the next secondary transfer.

Further, according to the above prior transfer means, there is a problem that when a thin line image is transferred on a recording medium the surface of which is smooth, the failure of the transfer of toner (a void) occurs.

Further, according to the above prior transfer means, there is a problem that even if transfer on a recording medium the surface of which is smooth is satisfactory, transfer on a recording medium the surface of which is rough is insufficient and particularly, when multiple layers of toner is transferred as a multiple color image, the failure of transfer of toner of a layer far from the surface of a recording medium occurs.

Further, according to the above prior transfer means, there is a problem that in primary or secondary transfer, the deterioration of transfer efficiency and the omission (void) of a part of a toner image in transfer occurs. Also, in secondary transfer, there is a problem that it is difficult to transfer on a recording medium the surface of which is extremely irregular such as recycled paper and bond paper without lacking a part of an image. There is a problem that particularly, if toner the fluidity of which is high is used, toner is readily scattered in transfer, particularly, if primary or secondary transfer means which functions as a transfer electrode for applying transfer voltage to a transfer position is located in a position distant from its transfer position, a transfer electric field in the transfer position cannot be concentrated upon the transfer position, a toner image is scattered due to electrostatic force and if for example, the intermediate transfer belt is wound on the photoconductive drum without means for substantially pressing the intermediate transfer belt on the photoconductive drum or a recording medium in a transfer position, area in which the photoconductive drum and the intermediate transfer belt are in contact in a transfer position is large and the turbulence of a toner image due to mechanical force caused by slight difference in speed between both and others readily occurs.

Further, according to the above prior transfer means, a monolayer or multilayer belt in which a conductive, a semiconductive or an insulating resin layer is generally formed at least as the surface layer, is used for the intermediate transfer belt. Thus, there is a problem that since the surface is made of resin as described above, friction and a scratch are readily generated. Particularly, a large quantity of particulates of metallic oxide generally adhere to the surface of a toner particle as an additive, and there is a problem that since the above additive is extremely harder than resin constituting the surface of the intermediate transfer belt, it is readily embedded in the intermediate transfer belt, further a phenomenon (so-called filming) in which toner adheres to the intermediate transfer belt in the above embedded point occurs and the deterioration of an image, for example the deterioration of transfer efficiency in primary or secondary transfer and the lack of a part of a toner image in transfer (void) occurs. Also, in secondary transfer, there is a problem that it is difficult to transfer on a recording medium the surface of which is extremely irregular, such as recycled paper and bond paper, without causing the imperfection of an image.

Further, according to the above prior transfer means, there is a problem that a phenomenon that a part of a toner image transferred on the intermediate transfer belt in primary transfer, particularly the center lacks, a so-called void occurs. Also, in secondary transfer, there is a problem that it is difficult to also transfer on a recording medium the surface of which is extremely irregular, such as recycled paper and bond paper, without causing an imperfect image in addition to the above problem of a void. Further, in an image formation apparatus for forming a full color image by overlapping plural colors for example, secondary transfer means is prevented from being stained by controlling the driving of the secondary transfer means for executing secondary transfer so that the means is not in contact with the intermediate transfer belt while images of each color are formed and is touched to the intermediate transfer belt after the final image is formed, and when secondary transfer is started before primary transfer is finished, an image on the intermediate transfer belt is prevented from being disturbed. However, there is a problem that the intermediate transfer belt is vibrated, the speed is varied, and the turbulence of an image occurs when the state of the secondary transfer means is switched to a state in contact or not in contact with the intermediate transfer belt.

Further, according to the above prior transfer means, transferability in a primary transfer part is insufficient. Concretely, there are problems in the quantity of toner (the thickness of the layer), dispersion in resistance among each member, the variation of transfer efficiency due to the variation of resistance, a phenomenon of a void, and the stability of the density due to aging.

Further, according to the above prior transfer means, transferability in a secondary transfer part is insufficient. Concretely, there are problems in the quantity of toner (the thickness of the layer), the type of a recording medium such as plain paper, a postal card, and OHP sheet, dispersion in resistance and the variation of resistance among each member, the variation of transfer efficiency due to the variation of resistance by environment, a phenomenon of a void, and the stability of the density due to aging.

Further, in the above prior transfer means, with respect to resistance which is the important characteristic of a primary transfer member and a secondary transfer member, members having approximately the same variation of resistance due to environment are used for both the primary and secondary transfer members.

Therefore, if a member having small variation of resistance due to environment is used for both, current may leak in a part not related to transfer and the failure of transfer may occur in case a recording medium such as a postal card and an envelope smaller in size than the width of the secondary transfer member is printed in the environment of low temperature and low humidity in which the resistance of the recording medium is higher than that of the secondary transfer member in a secondary transfer part. To avoid the above situation, it is conceivable to increase the resistance of the secondary transfer member and reduce leakage current. However, since a member having small variation of resistance due to environment generally has the large dispersion of the resistance, there is a problem that the nonuniformity of transfer partly occurs.

In the meantime, if a member having large variation of resistance due to environment is used for both, no failure due to a leak of secondary transfer occurs because the resistance of the secondary transfer member changes approximately as the change of the resistance of a recording medium due to environment. However, voltage required in a primary transfer part in the environment of low temperature and low humidity causes the increase of the cost.

Further, in a prior transfer means as disclosed in Japanese Patent Application No. Hei. 7-322667, an imperfect image is prevented from occurring at the simultaneous timing of primary transfer and secondary transfer by providing a conductive layer to the intermediate transfer belt and setting relationship between resistance $R_T$ of a part from a primary transfer bias applying power source to the conductive layer and apparent resistance R1 in a primary transfer part so that $R_T < R1$.

According to above prior transfer means, there is a case that it is insufficient, depending upon environment and the type of paper, to prevent an imperfect image from occurring at the simultaneous timing of primary transfer and secondary transfer. Concretely, if current which flows in secondary transfer is larger than current which flows in primary transfer, the phenomenon is remarkable.

SUMMARY OF THE INVENTION

The present invention is made to solve the above problems, and an object thereof is to provide a recording medium carrier system which is capable of easily dealing with various troubles caused by high-speed carriage of recording paper.

Another object of the invention is to provide an intermediate transfer unit by which the travel speed of an intermediate transfer belt in a primary transfer position can be stabilized.

Still another object of the invention is to provide an intermediate transfer unit by which the rear of a recording medium is not stained using an intermediate transfer belt with a joint.

Still another object of the invention is to provide an intermediate transfer unit for enabling satisfactory transfer onto a recording medium the surface of which is smooth such as OHP. The object is also to provide an intermediate transfer unit for enabling satisfactory transfer onto a recording medium the surface of which is smooth, in an overall area in the direction of the shaft of a transfer roller. The object is further to provide an intermediate transfer unit for enabling satisfactory transfer onto a recording medium the surface of which is smooth and simultaneously for maintaining a high quality of image for a long term and also enabling satisfactory transfer onto a recording medium the surface of which is rough. The object is furthermore to provide an intermediate transfer unit for enabling the formation of an image uniform in color in any density area on a recording medium the surface of which is smooth.

Still another object of the invention is to provide an intermediate transfer unit for enabling satisfactory transfer onto a recording medium the surface of which is rough such as bond paper. The object is also to provide a compact and low-cost intermediate transfer unit for enabling satisfactory transfer onto a recording medium the surface of which is rough and simultaneously for enabling the reduction of torque for driving a transfer roller. The object is further to provide an intermediate transfer unit for enabling satisfactory transfer onto a recording medium the surface of which is rough and simultaneously for maintaining a high quality of image for a long term. The object is furthermore to provide an intermediate transfer unit for enabling the formation of an image approximately uniform in color in any density area on a recording medium the surface of which is rough.

Still another object of the invention is to provide an intermediate transfer unit for forming a satisfactory image without the lack of a part of an image such as a void in transfer.

Still another object of the invention is to provide an intermediate transfer unit enabling the stabilization of transferability (transfer efficiency) in a primary transfer part.

Still another object of the invention is to provide an intermediate transfer unit enabling the stabilization of transferability (transfer efficiency) in the secondary transfer part.

Still another object of the invention is to provide an intermediate transfer unit enabling the stabilization of transferability (transfer efficiency) in the secondary transfer part and the reduction of the capacity of the high-voltage power source.

Still another object of the invention is to provide an intermediate transfer unit which can prevent the deterioration of an image in simultaneous transfer of primary transfer and secondary transfer.

In order to achieve the above objects, according to a first aspect of the invention, in a recording medium carrier system, a paper feed mechanism for carrying a recording medium to a transfer part, a mechanism for transferring a toner image onto a recording medium, a mechanism for fixing the transferred toner image on the recording medium, and a mechanism for ejecting the recording medium from a fixing part are respectively constituted as an independent unit.

According to a second aspect of the invention, an intermediate transfer unit is provided with an intermediate transfer belt to which a toner image formed on a photoconductive drum is primarily transferred and which further secondarily transfers the toner image onto a recording medium, and with a driving roller for circulating the intermediate transfer belt and is characterized in that the above primary transfer position is arranged close to the driving roller.

According to the intermediate transfer unit of the second aspect, since its primary transfer position is arranged close to the driving roller, the shrinkage of the intermediate transfer belt between the primary transfer position and the driving roller is reduced, the travelling speed of the intermediate transfer belt in the primary transfer position is stable and as a result, primary transfer in a satisfactory state is readily acquired.

According to a third aspect of the invention, an intermediate transfer unit is provided with an intermediate transfer belt with a joint to which a toner image formed on a photoconductive drum is primarily transferred by a primary transfer member and which further secondarily transfers the toner image onto a recording medium using a secondary transfer roller, and with a driving roller for circulating the intermediate transfer belt and is characterized in that an electric field in a direction in which the above toner is returned from the secondary transfer roller to the intermediate transfer belt is formed while the secondary transfer roller is pressed on the intermediate transfer belt when no image is formed, and the secondary transfer roller is detached when the joint of the intermediate transfer belt is opposite to the secondary transfer roller.

According to the intermediate transfer unit of the third aspect, it is possible to prevent the phenomenon that toner adheres to the secondary transfer roller by direct contact thereof with the joint of the intermediate transfer medium, therefore, the rear of a recording medium can be prevented from being stained and the intermediate transfer unit for enabling satisfactory transfer can be readily obtained.

According to a fourth aspect of the invention, an intermediate transfer unit is provided with an intermediate transfer belt to which a toner image formed on a photoconductive drum is primarily transferred by a primary transfer member and which further secondarily transfers the toner image onto a recording medium using a secondary transfer roller and with a driving roller for circulating the intermediate transfer belt and is characterized in that the above intermediate transfer belt includes dispersed fluoric particulates at least in the surface layer and the above secondary transfer roller is pressed on the intermediate transfer belt under the linear pressure of 27 gf/mm or less.

Also, in the above intermediate transfer unit, the hardness of the above secondary transfer roller is set to 70° or less in case the hardness is measured by Asker-C hardness meter.

Also, in the above intermediate transfer unit, plural types of additives different in a particle diameter are added in the above toner and the surface coverage of them is 2 or more.

Also, in the above intermediate transfer unit, the above toner image transferred on the above intermediate transfer belt is 1.5 mg/cm$^2$ or less per unit area in any density area.

According to the intermediate transfer unit of the fourth aspect of the invention, since the intermediate transfer belt has an excellent mold releasing property, toner is readily released in secondary transfer, and when a thin line image is transferred onto a recording medium the surface of which is smooth, satisfactory transfer is enabled even if pressure applied to toner is not fixed. Further, since the hardness of the secondary transfer roller is set to 70° or less in case the hardness is measured by Asker-C hardness meter, the concentration of transfer pressure is avoided in a linear image on the intermediate transfer belt and the occurrence of a void can be reduced.

Also, according to the intermediate transfer unit, since pressure applied to toner is uniform when a thin line image is transferred onto a recording medium the surface of which is smooth, satisfactory transfer is enabled.

Also, according to the intermediate transfer unit, since an additive with a relatively large particle diameter is added, the additive is not embedded in a mother particle for a long term but the fluidity is maintained and the quality of an image is stable, and since an additive with a relatively small particle diameter is added, the surface coverage is large compared with the added weight, and even if pressure applied to toner is not fixed when a thin line image is transferred onto a recording medium the surface of which is smooth, satisfactory transfer is enabled.

Also, according to the intermediate transfer unit, since the height of a toner layer is limited and pressure applied to toner is made uniform when a thin line image is transferred onto a recording the surface of which is smooth, by forming a toner layer in any density area under the condition that the quantity of toner to be transferred secondarily is 1.5 mg/cm$^2$ or less, satisfactory transfer is enabled.

According to a fifth aspect of the invention, an intermediate transfer unit is provided with an intermediate transfer belt to which a toner image formed on a photoconductive drum is primarily transferred by a primary transfer member and which further secondarily transfers the toner image onto a recording medium using a secondary transfer roller and with a driving roller for circulating the intermediate transfer belt, and is characterized in that the above toner is coated with an additive at the surface coverage of 2 or more and the above secondary transfer roller is pressed on the intermediate transfer belt under the linear pressure of 15 gf/mm or more.

Also, in the above intermediate transfer unit, the hardness of the above secondary transfer roller is set to 50° or more in case the hardness is measured by Asker-C hardness meter.

Also, in the above intermediate transfer unit, plural types of additives different in a particle diameter are added in the above toner.

Also, in the above intermediate transfer unit, the toner image transferred on the intermediate transfer belt is 1.5 mg/cm$^2$ or less per unit area in any density area.

According to the intermediate transfer unit of the fifth aspect of the invention, since toner is coated with a sufficient quantity of additive, the force of the toner which adheres to the intermediate transfer belt can be reduced, toner can be also transferred in a concave portion of a recording medium the surface of which is rough, and secondary transfer in a satisfactory state can be readily acquired. Further, since a recording medium the surface of which is rough is pressed on the intermediate transfer belt under sufficient linear pressure, the concave portion of the recording medium can be brought close to a toner image on the intermediate transfer belt, and secondary transfer in a satisfactory state can be readily acquired.

Also, according to the above intermediate transfer unit, since the increase of driving torque by the excessive broadening of a secondary transfer nip formed by the secondary transfer roller and the intermediate transfer belt can be prevented, a driving motor can be miniaturized and an intermediate transfer unit which does not require large space and high cost can be readily obtained.

Also, according to the above intermediate transfer unit, since an additive with a relatively large particle diameter is added, the additive is not embedded in a mother particle for a long term but the fluidity is maintained and the quality of an image is stable. Further, since an additive with a relatively small particle diameter is also added, the surface coverage is large compared with the added weight and satisfactory transfer onto a recording medium the surface of which is rough is enabled.

Also, according to the above intermediate transfer unit, the occurrence of irregular color due to the transfer failure of toner of a layer farthest from a recording medium is small by forming a toner layer in any density area under the condition that the quantity of toner to be transferred secondarily is 1.5 mg/cm$^2$ or less.

According to a sixth aspect of the invention, an intermediate transfer unit is provided with an intermediate transfer belt to which a toner image formed on a photoconductive drum is primarily transferred in a primary transfer position and which further secondarily transfers the toner image onto a recording medium in a secondary transfer position; primary transfer means arranged inside the intermediate transfer belt, the intermediate transfer belt being carried between the photoconductive drum and the primary transfer means in the primary transfer position; and backup means arranged inside the intermediate transfer belt and secondary transfer means arranged outside the intermediate transfer belt, the intermediate transfer belt being carried between the backup means and the secondary transfer means in the secondary transfer position, and is characterized in that the loose apparent density of the toner is set to 0.35 g/cc or more, the shape factor SF-1 of the toner is set to 150 or less, and SF-2 is set to 140 or less.

According to the intermediate transfer unit of the sixth aspect, a void is prevented from occurring in transfer by pressing the primary transfer means and the secondary transfer means onto the intermediate transfer belt in the respective transfer positions, and satisfactory transfer is also enabled onto a recording medium the surface of which is extremely irregular such as recycled paper and bond paper.

According to a seventh aspect of the invention, an intermediate transfer unit is provided with an intermediate transfer belt to which a toner image formed on a photoconductive drum is primarily transferred in a primary transfer position and which further secondarily transfers the toner image onto a recording medium in a secondary transfer position, primary transfer means arranged inside the intermediate transfer belt, and secondary transfer means arranged outside the intermediate transfer belt, and is characterized in that the load of the secondary transfer position is larger than a load in the primary transfer position.

In the intermediate transfer unit of the seventh aspect, the ratio of the load in the secondary transfer position to the load in the primary transfer position is 1.5 or more.

According to the intermediate transfer unit of the seventh aspect, a void is prevented from occurring in transfer by pressing the primary transfer means on the intermediate transfer belt by a relatively small load, satisfactory transfer is also enabled onto a recording medium the surface of which is extremely irregular such as recycled paper and bond paper by pressing the secondary transfer means onto the intermediate transfer belt by a relatively large load and further, the durability of the intermediate transfer belt can be enhanced.

According to an eighth aspect of the invention, an intermediate transfer unit is provided with an intermediate transfer belt for primarily transferring a toner image formed on a photoconductive drum and further, secondarily transferring the toner image onto a recording medium, primary transfer means arranged inside the intermediate transfer belt, and secondary transfer means arranged outside the intermediate transfer belt, and is characterized in that the hardness of the secondary transfer means is higher than that of the primary transfer means.

In the intermediate transfer unit of the eighth aspect, the hardness of the secondary transfer means is higher than that of the primary transfer means by 10 degrees or more when measured by Asker-C hardness meter.

According to the intermediate transfer unit of the eighth aspect of the invention, since the hardness of the primary transfer means is relatively low, a void is prevented from occurring in transfer. Since the hardness of the secondary transfer means is relatively high, satisfactory transfer is also enabled onto a recording medium the surface of which is extremely irregular and further, the turbulence of an image caused by switching of the position of the secondary transfer means between positions in contact and not in contact with the intermediate transfer belt, can be prevented.

According to a ninth aspect of the invention, an intermediate transfer unit is characterized in that a toner image formed on the photoconductive drum is primarily transferred onto an intermediate transfer belt by supplying bias from a high-voltage power source to a primary transfer member arranged at the rear of the intermediate transfer belt, the resistance of the primary transfer member is set to $10^6$ to $10^8$ Ω, the surface resistivity of the intermediate transfer belt is set to $10^8$ to $10^{12}$ Ω/□, the volume resistivity is set to $10^8$ to $10^{12}$ Ωcm, the high-voltage power source has constant-current control when impedance in the primary transfer part is large and has constant-voltage control when the impedance is small.

According to the intermediate transfer unit of the ninth aspect of the invention, the control of the high-voltage power source is optimized. Therefore, since control under fixed current is executed in the case of a printing pattern in which 2 to 4 toner layers are overlapped, that is, when impedance is large, a required transfer electric field is secured every toner layer. In the meantime, since control under fixed voltage is executed in the case of a pattern in which the ratio of printing is small, that is, when impedance is small, a required and minimum electric field for transferring toner is secured. Also, since the resistance of the primary transfer member and the intermediate transfer belt is optimized, transfer is enabled at required and minimum voltage and current, and an imperfect image can be prevented from occurring due to abnormal discharge and others.

Also, since the hardness of the primary transfer member and a load onto the photoconductive drum by the primary transfer member are optimized, the dislocation of an image in primary transfer is prevented and a void can be prevented from occurring.

Also, a void can be prevented from occurring by optimizing the quantity of an additive with a small particle diameter of two types of additives different in a particle diameter added to toner and securing the fluidity of the toner, and the deterioration of density due to aging can be also inhibited by function that the superficial state of toner is hardly varied due to aging by optimizing the quantity of an additive with a large particle diameter.

According to a tenth aspect of the invention, an intermediate transfer unit is characterized in that a toner image formed on a photoconductive drum is primarily transferred onto an intermediate transfer belt, the toner image is secondarily transferred onto a recording medium by supplying bias from a high-voltage power source to a secondary transfer member pressed onto the backup roller, the resistance of the secondary transfer member is set to $10^6$ to $10^8$ Ω, the surface resistivity of the intermediate transfer belt is set to 108 to $10^{12}$ Ω/□, the volume resistivity is set to $10^8$ to $10^{12}$ Ωcm, the high-voltage power source has constant-current control when impedance in the secondary transfer part is large and has constant-voltage control when the impedance is small.

According to the intermediate transfer unit of the tenth aspect of the invention, the control of the high-voltage power source is optimized. Therefore, when impedance is large as in transferring onto a recording medium in environment in which temperature and humidity are low and onto an OHP sheet, a transfer electric field required for constant-current control is secured and high transfer efficiency is maintained. In the meantime, since constant-voltage control is executed when impedance is small as in transferring onto a recording medium in environment in which temperature and humidity are high and onto a recording medium the width of which is narrower than that of the secondary transfer member, a required and minimum electric field for transferring toner is secured. Also, since the resistance of the secondary transfer member and the intermediate transfer belt is optimized, transfer is enabled at required and minimum voltage and current and an imperfect image can be prevented from occurring due to abnormal discharge and others.

Also, since the hardness of the secondary transfer member and a load onto the backup roller by the secondary transfer member are optimized, the dislocation of an image in secondary transfer is prevented and satisfactory transfer is also enabled onto a recording medium the surface of which is rough such as bond paper.

Also, a void can be prevented from occurring by optimizing the quantity of an additive with a small particle diameter of two types of additives different in a particle diameter added to toner and securing the fluidity of the toner. Moreover, the deterioration of density due to aging can be also inhibited by function that the superficial state of toner is hardly varied due to aging by optimizing the quantity of an additive with a large particle diameter.

According to an eleventh aspect of the invention, an intermediate transfer unit for primarily transferring a toner image formed on a photoconductive drum onto an intermediate transfer belt by supplying bias from a high-voltage power source to a primary transfer member arranged at the rear of the intermediate transfer belt and secondarily transferring the toner image onto a recording medium by supplying bias from a high-voltage power source to a secondary transfer member pressed on a backup roller, is characterized in that the primary transfer member and the secondary transfer member are formed by an elastic body, and the variation of the resistance of the secondary transfer member due to environment is set so that it is larger than that of the primary transfer member.

According to the intermediate transfer unit of the eleventh aspect of the invention, the change of the resistance of the primary transfer member and the secondary transfer member due to environment is optimized. Since the primary transfer member is made of a member having small change of resistance due environment, the capacity of a primary transfer power source can be reduced. In the meantime, since the secondary transfer member is made of a member having large change of resistance due to environment, no failure of transfer occurs both in the environment of low temperature and low humidity and in the environment of high temperature and high humidity because the resistance changes approximately as that of a recording medium such as paper.

According to a twelfth aspect of the invention, an intermediate transfer unit primarily transfers a toner image formed onto a photoconductive drum onto an intermediate transfer belt by applying bias from a high-voltage power source to a primary transfer member arranged in a position different from a primary transfer part on the surface of the intermediate transfer belt, and secondarily transfers the toner image onto a recording medium by applying bias to a secondary transfer member, and is characterized in that a backup member in the primary transfer part is an elastic body, the resistance of the primary transfer member is set to 1 MΩ or less, and a high-voltage power source for applying bias to the primary transfer member has current absorbable constant-voltage control.

According to a thirteenth aspect of the invention, an intermediate transfer unit primarily transfers a toner image formed on a photoconductive drum onto an intermediate transfer belt by applying bias from a high-voltage power source to a primary transfer member arranged in a position different from a primary transfer part on the surface of the intermediate transfer belt, and secondarily transfers the toner image onto a recording medium by applying bias to a secondary transfer member, and is characterized in that a backup member in the primary transfer part is an elastic body, the resistance of the primary transfer member is set to 1 MΩ or less, and a resistor is connected to a high-voltage power source, which applies bias to the primary transfer member, in parallel.

DETAILED DESCRIPTION OF THE INVENTION

Preferred embodiments of the present invention will now be described below.

Figure 1:
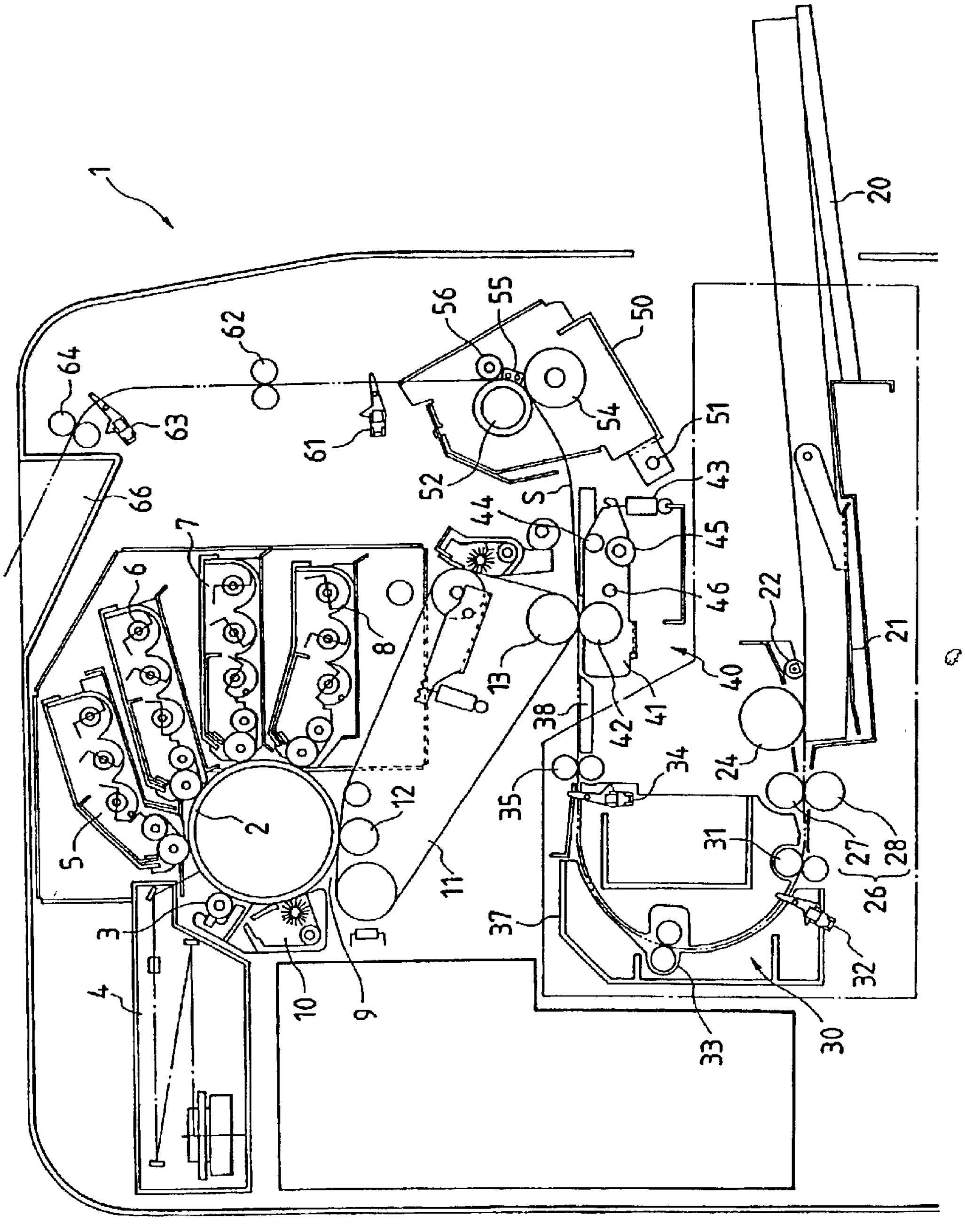
FIG. 1 is a block diagram of an apparatus showing an embodiment of the present invention.

FIG. 1 shows the outline of a color image formation apparatus provided with a recording medium carrier system of an embodiment of the present invention.

First, the whole system of the apparatus will be described. Around a photoconductive drum 2 in FIG. 1, in the order from the upstream side in the rotational direction, there are provided a charging roller 3, a laser beam scanning type latent image formation unit 4, developing units of yellow, magenta, cyan and black 5, 6, 7 and 8, and a cleaning unit 10 opposite to a first transfer part 9. The above apparatus is constructed so that a toner image according to recording information is formed on the photoconductive drum 2 by repeating each imaging process of yellow, magenta, cyan and black every rotation of the photoconductive drum 2.

In the meantime, an intermediate transfer belt 11 without an end touched or detached to/from the photoconductive drum 2 in the transfer part 9 is constructed so that a color toner image formed on the peripheral surface of the photoconductive drum 2 is transferred onto the intermediate transfer belt by a primary transfer roller 12 and is secondarily transferred onto a recording medium S by a backup roller 13. Recording paper S piled on a paper supply cassette 20 reaches a secondary transfer part via a pickup roller 24 and pairs of paper carriage rollers 31 and 33, and in the secondary transfer part, a color toner image is transferred onto the recording paper. Further, after the transferred color toner image is fixed by a fixing unit 50, the recording paper is ejected onto a paper ejection tray 66 via pairs of paper ejecting rollers 62 and 64.

Next, a recording paper carrier mechanism will be described in detail. The paper supply cassette 20 is constructed so that it can be installed in the lower part at the front of the frame 1 of the apparatus, that is, in the lower part in FIG. 1, and the fixing unit 50 can be turned forward so that recording paper S can be readily supplied and measures for paper jam can be taken.

A paper pushing-up plate 21 provided to the above paper supply cassette 20 is coupled to a driving motor via a stepping clutch not shown and stopped at 120° and 240° so that the paper pushing-up plate is driven by the single driving motor not shown for driving a cam 45 for touching or detaching a secondary transfer roller 41 and all the pair of paper separating rollers 26 and the pairs of paper carriage rollers 31 and 33 between the pickup roller 24 and the pair of gate rollers 35, and can be vertically moved. The paper pushing-up plate is constituted so that it is lifted when the whole apparatus starts operation and lowered after printing operation is finished. Further, a pressing roller 22 made of resin for pressing an envelope and others is provided to the paper supply cassette 20 at the back of the pickup roller 24 so that slanting at paper supply, which may be caused because the edge of the uppermost envelope of piled ones is lifted and is slantwise touched to the pickup roller 24, can be prevented.

In the meantime, the pickup roller 24 for feeding recording paper S pushed up by the paper pushing-up plate 21 is formed as a roller approximately 40 mm long which is made of rubber the hardness of which is 25 to 40° and is constituted so that the pickup roller comes in contact with the center in width of paper, and is driven via a first clutch not shown so that the pickup roller is interlocked with the pair of paper separating rollers 26.

The pair of paper separating rollers 26 arranged close on the downstream side in a direction in which paper is fed of the pickup roller 24, consist of an upper separating roller 27 rotated in the carriage direction of paper and a lower separating roller 28 normally rotated and reversely rotated via a torque limiter, and both are respectively formed as a roller approximately 40 mm long so that each roller comes in contact with the center in width of recording paper S and plural sheets are prevented from being fed.

In the meantime, a paper carriage path between the pair of paper separating rollers 26 and the secondary transfer part functions as a paper reversing carriage path 30 for reversing recording paper S. In this portion, first and second pairs of carriage rollers 31 and 33 and a pair of gate rollers 35 are arranged at an interval at which a postal card can be fed longitudinally or according to circumstances, are arranged at an interval at which an envelope can be fed sideways, and are constituted so that driving force is transmitted via a second clutch.

The first pair of carriage rollers 31 are arranged close on the downstream side of the pair of paper separating rollers 26 and are constituted as rollers of the length equal to the width of recording paper S to supplement the unstable feeding of the pair of paper separating rollers 26 which hold only the center in width of paper and carry it.

The pair of gate rollers 35 are supported by a plain bearing, whereas these first and second pairs of carriage rollers 31 and 33 are supported by a ball bearing. The above rollers are constituted so that the free rotation torque of these pairs of carriage rollers is smaller than that of the pair of gate rollers 35 and even if recording paper S fed at high speed collides with the pair of gate rollers 35, the pair of gate rollers 35 are prevented from being moved by the force of the collision.

Further, in the paper reversing carriage path 30, tensile force is prevented from being applied to recording paper S in the carriage process by setting the peripheral speed of each pair of rollers 26, 31 and 33 between the pickup roller 24 and the pair of gate rollers 35 so that it is slower in order and furthermore, recording paper S is prevented from being slipped in the secondary transfer part by setting the peripheral speed of the pair of gate rollers 35 so that it is faster than that of the transfer belt 11.

The peripheral speed of each pair of rollers 26, 31 and 33 has only to be set in an extent that the peripheral speed of the roller on the upstream side when the tolerance of the diameter of the roller on the downstream side is maximum, is equal to or slower than the peripheral speed of the roller on the upstream side when the tolerance of the diameter of the roller on the upstream side is maximum. Also, the peripheral speed of the pair of gate rollers 35 has only to be set in an extent that the peripheral speed of the gate roller when the tolerance of the diameter of the gate roller is minimum, is equal to or faster than the speed of the transfer belt 11.

In the paper reversing carriage path 30, first and second paper sensors 32 and 34 are arranged close on the downstream side of the first pair of carriage rollers 31 and close on the upstream side of the pair of gate rollers 35. If recording paper does not reach the first paper sensor 32 after predetermined time elapses since the pickup roller 24 starts the feed of the recording paper, it is supposed that the second paper sensor 34 detects abnormality independent of whether the second paper sensor 34 detects the recording paper or not, and a signal is output to control means. Therefore, the quantity of information to be sent to the control means is reduced by the quantity of the signal.

The pickup roller 24, the pair of paper separating rollers 26, the first and second pairs of carriage rollers 31 and 33, and the pair of gate rollers 35 described above are assembled as one paper feed unit 37 as shown by a broken line in FIG. 1. The paper feed unit is attached to the body 1 of the apparatus so that it can be detached from the body, and is constituted so that it can be also connected to a paper supply cassette with large capacity.

In the meantime, reference number 40 denotes a secondary transfer roller unit arranged on the downstream side of the pair of gate rollers 35 via a paper guide member 38. The unit 40 is constituted by a swing lever 41 which can be swung around a supporting point 43 with the swing lever pressed by the spring 43 so that the secondary transfer roller 42 supported by the swing lever is always in contact with the transfer belt 11, and the cam 45 for swinging the swing lever 41 so that the secondary transfer roller 42 is detached from the transfer belt 11 via a cam follower 44.

The cam 45 for touching or detaching is coupled to the driving motor via the stepping clutch 4 not shown so that the cam is stopped in plural positions in one rotation, at 120° and 240° in this embodiment, and the lead of the cam is formed to have an extremely small sine curve so that the secondary transfer roller is detached from the transfer belt 11 in a range in which atmospheric discharge may occur by applying voltage to the transfer belt 11, for example, approximately 1 mm.

Shock when the secondary transfer roller 42 comes in contact with the transfer belt 11 is reduced and the deterioration of the quality of an image due to the shock is prevented by constituting as described above. The application of voltage to the secondary transfer roller 42 is controlled so that after the secondary transfer roller 42 comes in contact with the transfer belt 11, current application is started and before the secondary transfer roller 42 is detached, current application is stopped to prevent atmospheric discharge from occurring actually.

Reference number 50 denotes a fixing unit for fixing a transferred toner image on recording paper S. The fixing unit 50 is attached so that it can be turned outside with a supporting part 51 provided at the inner lower end as a supporting point and is constructed so that paper jam caused on paper ejecting path can be easily handled and each developing unit 5 to 9 can be easily replaced.

The fixing unit 50 is constituted by a heat roller 52, first and second pressurizing rollers 54 and 56 pressed on the heat roller 52, and a heat insulating member 55 arranged among them. Toner can be more securely fixed at higher speed by providing large nip length and large contact pressure to the first pressurizing roller 54 to provide a function for melting toner, in the meantime, providing large curvature to the second pressurizing roller 56 to provide a function for fixing toner, and further, providing a function for guiding recording paper and a function for controlling heat radiation from the heat roller 52 to the heat insulating member 56.

A group of pairs of paper ejecting rollers following the fixing unit 50, that is, two pairs of paper ejecting rollers 62 and 64 in this embodiment are attached to the front side of the apparatus 1 as one paper ejecting roller unit.

These pairs of paper ejecting rollers 62 and 64 are constructed so that recording paper can be ejected on the paper ejection tray 66 with the recording paper S tense by setting the paper carriage speed of these pairs of paper ejecting rollers 62 and 64 so that it is faster than that of the fixing unit 50 and setting the paper carriage speed of the pair of paper ejecting rollers 64 on the downstream side in the paper carriage direction so that it is faster than that of the pair of paper ejecting rollers 62 on the upstream side.

The peripheral speed of each pair of paper ejecting rollers 62 and 64 has only to be set in an extent that the peripheral speed of the roller on the downstream side when the diameter of the roller is maximum, is equal to or not slower than the peripheral speed of the roller on the upstream side when the diameter of the roller is minimum according to the same thought as in the case of the above rollers on the paper feed path. Reference numbers 61 and 63 denote each paper detecting sensor arranged on the paper ejecting path.

Next, the recording paper carriage operation of the apparatus constructed as described above will be described referring to FIG. 2.

When the operation of the whole apparatus is started at time "a" after a period for initialization for supplying paper, the paper pushing-up plate 21 pushes up loaded recording paper S and touches the center in width of the uppermost paper to the pickup roller 24.

When a paper feed/separating roller clutch is connected at time "b" in relation to an imaging process, and the pickup roller 24 the rotation of which is started, feeds first recording paper S, the pair of paper separating rollers 26 arranged close on the downstream side of the pickup roller prevent plural sheets from being fed by rotating the lower separating roller 28 reversely. A paper carriage roller clutch connected together with the paper feed/separating roller clutch transmits rotation to each first and second pair of carriage rollers 31 and 33 for time equivalent to the length of a paper path between the paper supply tray 20 and the pair of gate rollers 35, that is, till time c, and is touched to the full width of recording paper S from the pair of paper separating rollers 26 to carry it to the pair of gate rollers 35 in a stable state.

At time "d" after fixed time elapses after primary transfer is started, a gate roller clutch transmits driving force to the pair of gate rollers 35 for time equivalent to the length of a path between the pair of gate rollers 35 and the secondary transfer roller 42, that is, till time e, and at the same time, carries recording paper S to a transfer part in cooperation with the first and second pairs of carriage rollers 31 and 33 to which the driving force is transmitted via the paper carriage roller clutch, then executes required transfer processing on it.

Though different according to the length in the carriage direction of recording paper S, the paper feed/separating roller clutch for carrying second recording paper S is connected at time "f" before or after the operation of the gate roller clutch, at the following time "g", the paper carriage roller clutch transmits driving force to the first and second pairs of carriage rollers 31 and 33 for time equivalent to the length of a path between the first pair of carriage rollers 31 and the pair of gate rollers 35, that is, till time "h", and carries second recording paper S to the pair of gate rollers 35.

In the meantime, in such an apparatus in which recording paper is continuously carried, high durability and advanced paper carriage control means are provided. However, the wear and tear of parts and the occurrence of paper jam and others cannot be avoided. If such a situation occurs, a target unit of units respectively independently attached as the paper feed unit 37, a transfer unit 40, the fixing unit 50, and a paper ejecting unit 60 is detached from the body 1 of the apparatus by a user, or is replaced.

As described above, according to the present invention, since a paper feed mechanism, a transfer mechanism, a fixing mechanism, and a paper ejecting mechanism constituting a recording medium carrier system are constructed as an independent unit, a user can handle such a situation, by detaching or replacing a unit, that paper jam or the wear and tear of parts occurs in this type of image formation apparatus which continuously carries a recording medium at high speed. Thus, the cost required for maintenance can be reduced and the operation rate of the apparatus can be greatly enhanced.

Figure 3:
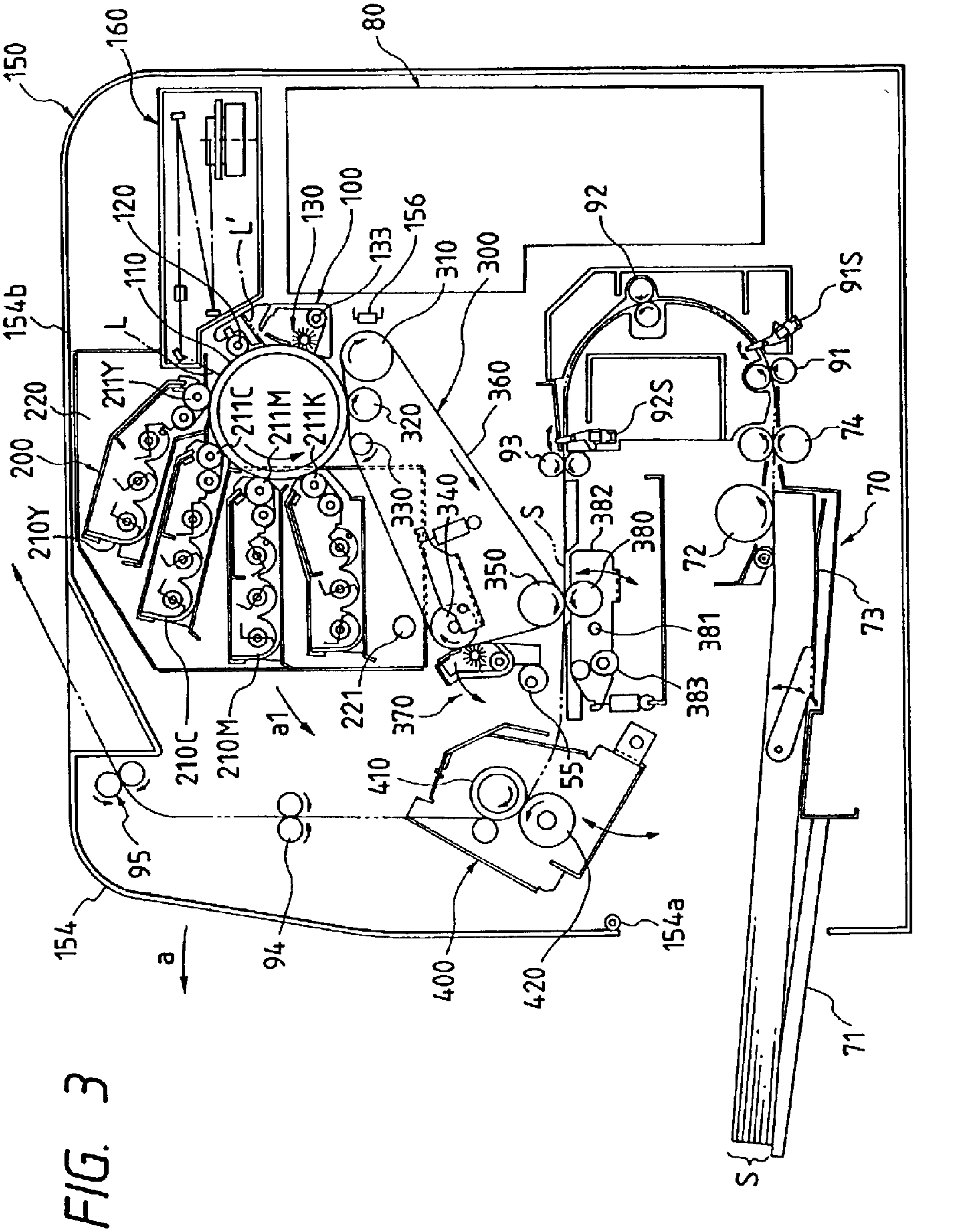
FIG. 3 is a schematic drawing showing an example of an image formation apparatus using an embodiment of an intermediate transfer unit according to the present invention.

FIG. 3 is a schematic drawing showing an example of an image formation apparatus using an embodiment of an intermediate transfer unit according to the present invention.

First, the outline of the image formation apparatus will be described and next, mainly the intermediate transfer unit will be described in detail.

A full color image can be formed using developing machines for four colors of toner of yellow, cyan, magenta and black by the above image formation apparatus.

In FIG. 3, reference number 150 denotes a case of the body of the apparatus and in this case 150, an exposure unit 160, a paper supply unit 70, a photoconductor unit 100, a developing unit 200, an intermediate transfer unit 300, a fixing unit 400, a control unit 80 for controlling the whole apparatus and others are provided.

The photoconductor unit 100 is provided with a photoconductive drum 110, a charging roller 120 as charging means which comes in contact with the peripheral surface of the photoconductive drum 110 and uniformly charges the peripheral surface, and cleaning means 130.

The developing unit 200 is provided with a developing section 210Y for yellow, a developing section 210C for cyan, a developing section 210M for magenta, and a developing section 210K for black as developing means. These developing sections 210Y, 210C, 210M and 210K respectively contain toner of yellow, cyan, magenta and black. The above developing sections are respectively provided with developing rollers 211Y, 211C, 211M and 211K, and are set so that only one of the above developing sections can come in contact with the photoconductive drum 110.

The intermediate transfer unit 300 is provided with a driving roller 310, a primary transfer roller 320, a wrinkle removing roller 330, a tension roller 340, a backup roller 350, an intermediate transfer belt 360 having no end and being extended around each roller, and cleaning means 370 touchable to or detachable from the intermediate transfer belt 360.

A secondary transfer roller 380 is arranged opposite to the backup roller 350. The secondary transfer roller 380 is supported so that the secondary transfer roller can be turned by an arm 382 supported by a supporting shaft 381 so that the arm can be swung. The secondary transfer roller is touched to or detached from the intermediate transfer belt 360 when the arm 382 is swung by the operation of a cam 383.

Figure 5:
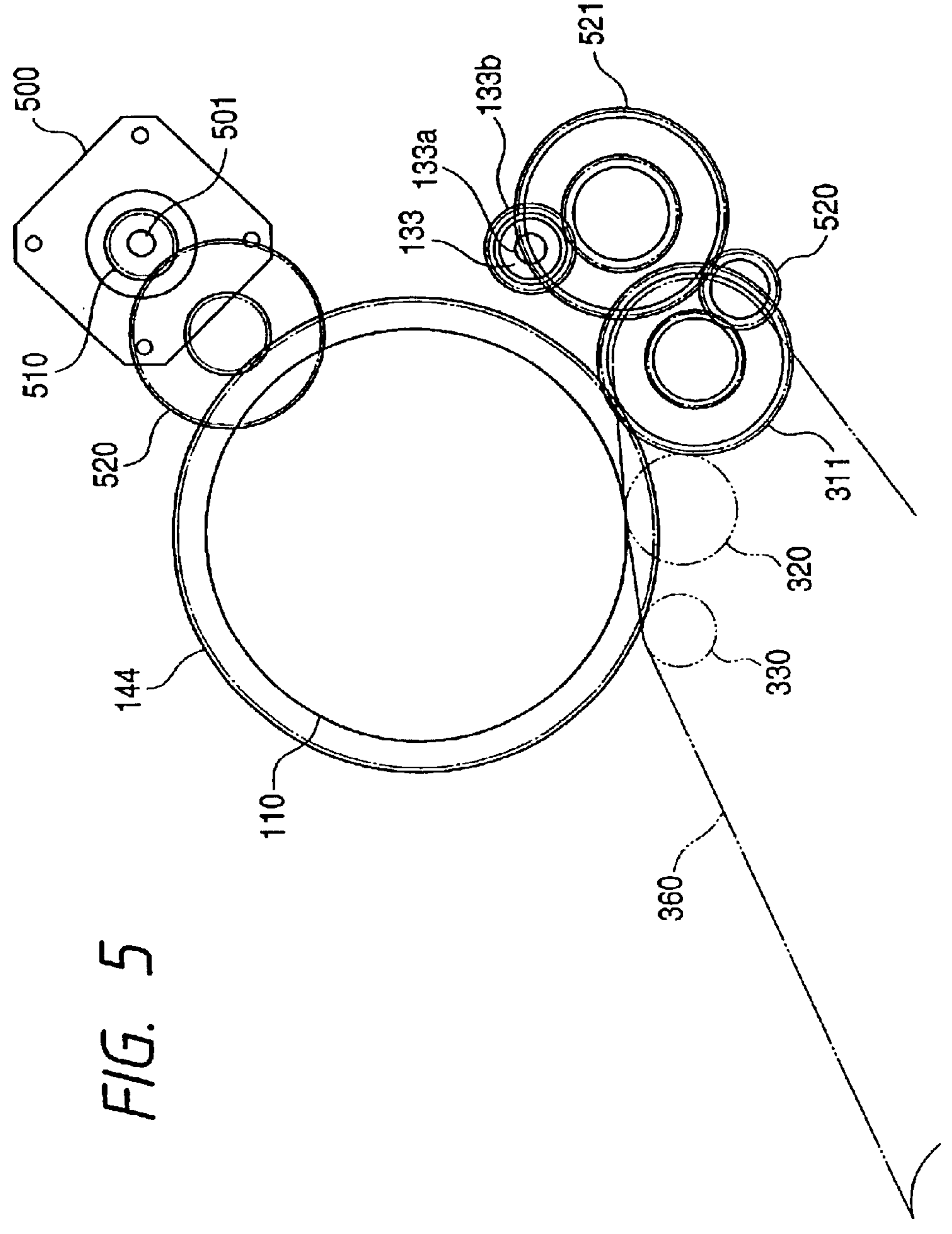
FIG. 5 shows the main part of a gear train.

A gear 311 shown in FIG. 5 is fixed to the end of the driving roller 310, and is rotated at the approximately same peripheral speed as the photoconductive drum 110, because the gear 311 is engaged with a gear 144 (see FIG. 5) of the photoconductor unit 100. Therefore, the intermediate transfer belt 360 is circulated at the approximately same peripheral speed as the photoconductive drum 110.

In a process in which the intermediate transfer belt 360 is circulated, a toner image on the photoconductive drum 110 is transferred on the intermediate transfer belt 360 between the primary transfer roller 320 and the photoconductive drum 110, and the toner image transferred on the intermediate transfer belt 360 is transferred on a recording medium S such as paper supported between the intermediate transfer belt and the secondary transfer roller 380. The recording medium S is supported from the paper supply unit 70.

The paper supply unit 70 is provided with a tray 71 on which plural sheets of recording mediums S are piled, a pickup roller 72, a hopper 73 for pushing the recording mediums S piled on the tray 71 toward the pickup roller 72, and a pair of separating rollers 74 for securely separating recording mediums fed by the pickup roller 72.

A recording medium S fed by the paper supply unit 70 is supplied to a secondary transfer part, that is, between the intermediate transfer belt 360 and the secondary transfer roller 380 through a pair of first carriage rollers 91, a first paper sensor 91S, a pair of second carriage rollers 92, a second paper sensor 92S, and a pair of gate rollers 93, and afterward, ejected on the case 50 through the fixing unit 400, a pair of first ejecting rollers 94, and a pair of second ejecting rollers 95.

The fixing unit 400 is provided with a fixing roller 410 provided with a heat source, and a pressurizing roller 420 pressed on the fixing roller.

The operation of the above whole image formation apparatus is as follows:

(i) When a printing command signal (an image formation signal) from a host computer not shown such as a personal computer is input to the control unit 80, the photoconductive drum 110, the developing roller and the like of the developing unit 200, and the intermediate transfer belt 360 are rotated.

(ii) The peripheral surface of the photoconductive drum 110 is uniformed charged by the charging roller 120.

(iii) Selective exposure L according to the image information of a first color (for example, yellow) is applied to the peripheral surface of the uniformly charged photoconductive drum 110 by the exposure unit 60 so that an electrostatic latent image for yellow is formed.

(iv) Only the developing roller 211Y of the developing section 210Y for the first color (for example, yellow) is touched to the photoconductive drum 110, hereby, the above electrostatic latent image is developed and the toner image of the first color (for example, yellow) is formed on the photoconductive drum 110.

(v) The toner image formed on the photoconductive drum 110 is transferred on the intermediate transfer belt 360 in a primary transfer part, that is, between the photoconductive drum 110 and the primary transfer roller 320. At this time, the cleaning means 370 and the secondary transfer roller 380 are detached from the intermediate transfer belt 360.

(vi) After toner left on the photoconductive drum 110 is removed by the cleaning means 130, the photoconductive drum 110 is deelectrified by deelectrifying light L' from deelectrification means.

(vii) The operation shown in the above items (ii) to (vi) is repeated if necessary. That is, processing for second, third and fourth colors is repeated according to the contents of the above printing command signal, and a toner image according to the contents of the printing command signal is overlapped on the intermediate transfer belt 360 and is formed on the intermediate transfer belt 360.

(viii) A recording medium S is supplied from the paper supply unit 70 at predetermined timing. Immediately before or after the end of the recording medium S reaches the secondary transfer part (in short, at timing at which a toner image on the intermediate transfer belt 360 is transferred in a desired position on the recording medium S), the secondary transfer roller 380 is pressed to the intermediate transfer belt 360, and the toner image (basically, a full color image) on the intermediate transfer belt 360 is transferred on the recording medium S. The cleaning means 370 comes in contact with the intermediate transfer belt 360 and after secondary transfer, toner left on the intermediate transfer belt 360 is removed.

(ix) When the recording medium S passes the fixing unit 400, a toner image is fixed on the recording medium S and afterward, the recording medium S is ejected on the case 150 via a pair of the paper ejecting rollers 94 and 95.

The outline of the image formation apparatus is described above. Next, the details of the intermediate transfer unit 300 will be mainly described.

Figure 4:
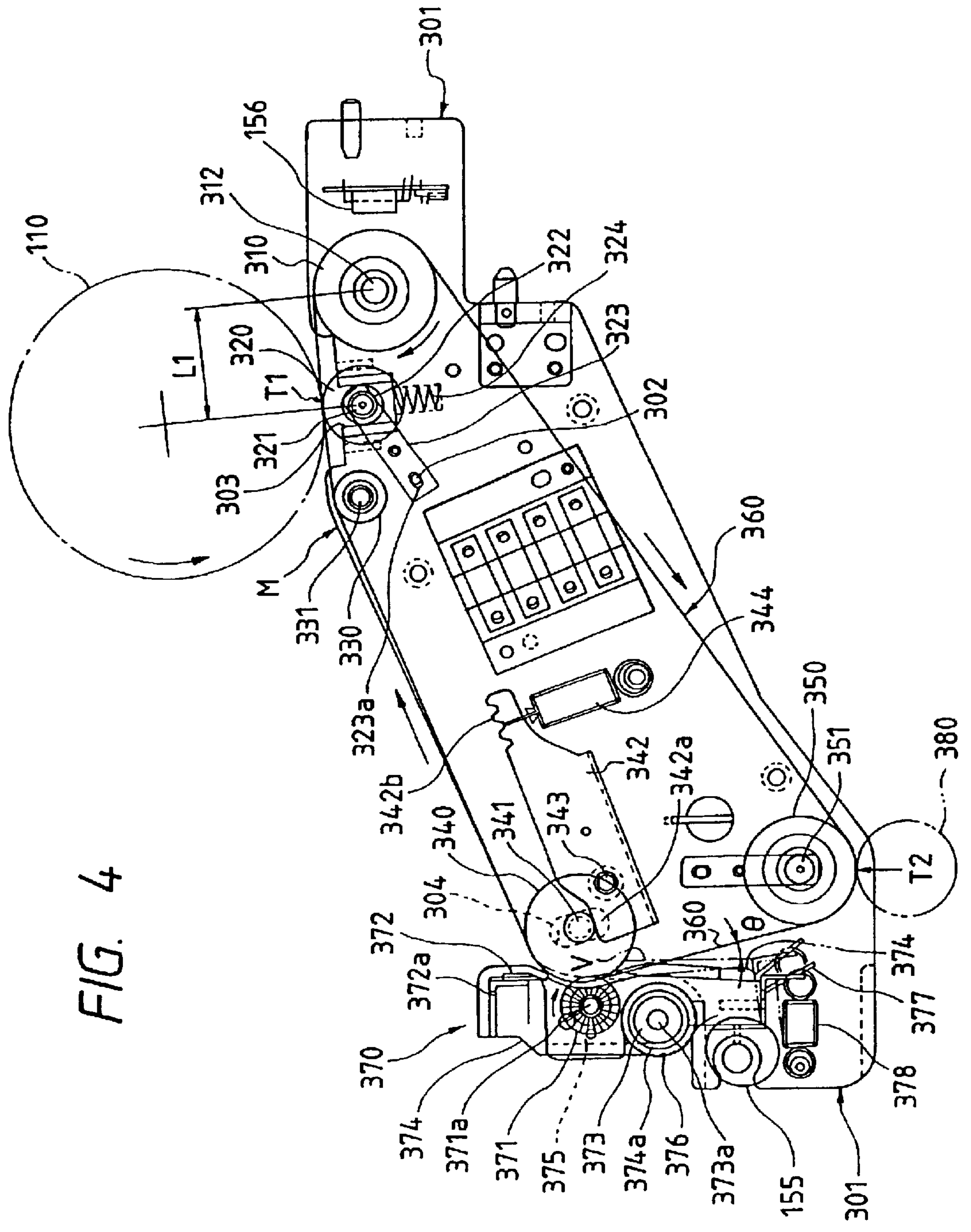
FIG. 4 is a side view omitting a part and mainly showing the intermediate transfer unit.

FIG. 4 is a side view, a part of which is omitted, showing the intermediate transfer unit 300 mainly.

As described above, the intermediate transfer unit 300 is provided with the driving roller 310, the primary transfer roller 320, the wrinkle removing roller 330, the tension roller 340, the backup roller 350, the intermediate transfer belt 360 having no end and being extended around the above each roller, and the cleaning means 370 which can be touched to or detached from the intermediate transfer belt 360. The above each member and others are attached to a frame 301 as shown in FIG. 4.

Figure 2:
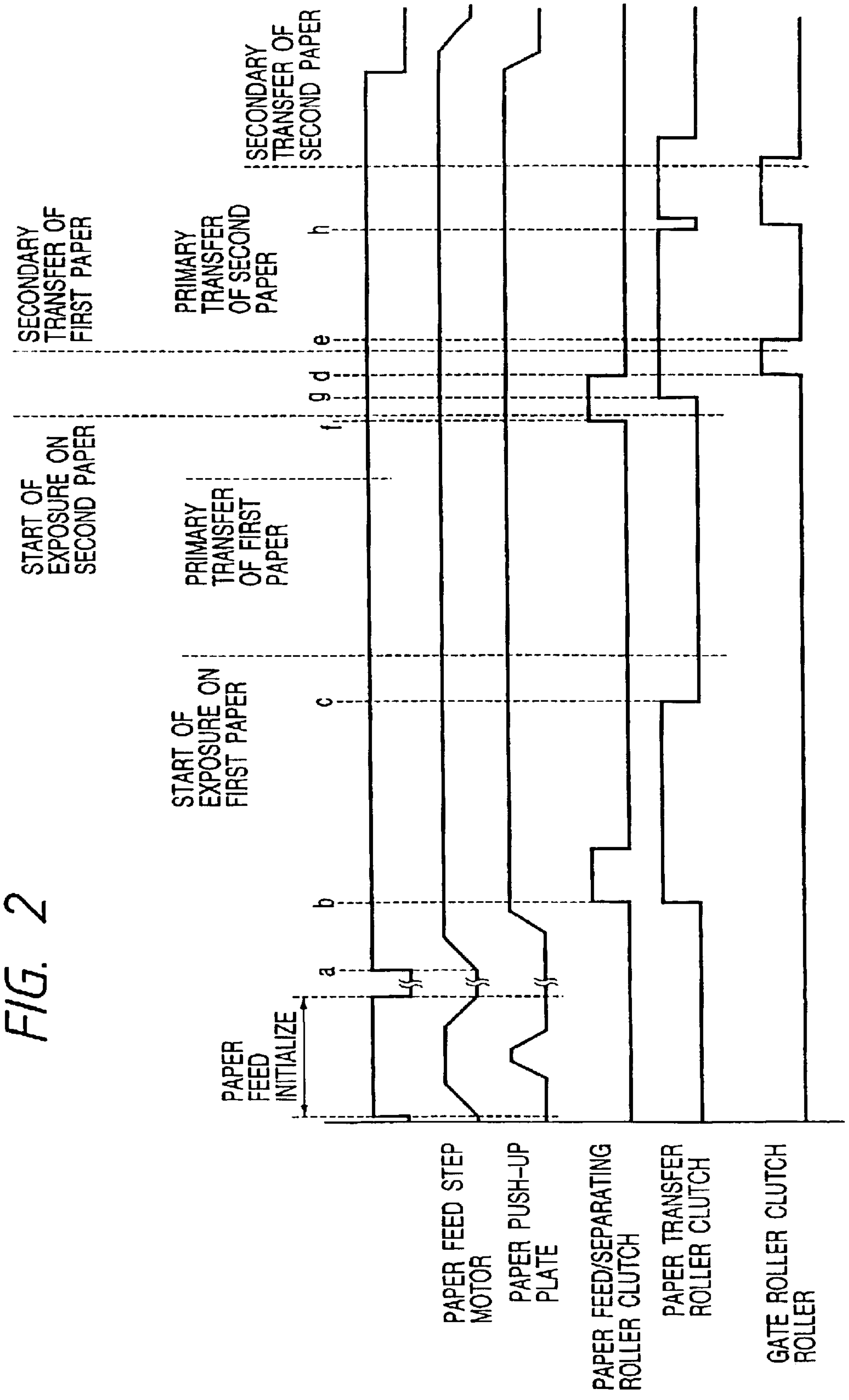
FIG. 2 is a timing chart showing the operation of the above apparatus.

The frame 301 is constituted by a pair of side plates (in FIG. 4, the side plate on this side is omitted), and the above each member and others are attached between both side plates. In other words, the frame is constructed so that a pair of the side plates are coupled by the shaft of the above each member. In FIG. 2, any member on this side of a pair of members which will be described below, is omitted.

The driving roller 310 is supported on the frame 301 by its shaft 312 so that the driving roller can be rotated, and the above gear 311 shown in FIG. 5 is fixed to the end thereof. The driving roller is constructed so that it is rotated at the approximately same peripheral speed as the photoconductor unit 100 because the gear 311 is engaged with the gear 144 of the photoconductor unit 100. As shown in FIG. 5, reference number 500 denotes a driving motor. The photoconductive drum 110 is rotated because a pinion 510 fixed to its output shaft 501 is engaged with the gear 144 provided to the end of the photoconductive drum 110 via a reduction gear 520. The gear 311 is engaged with the driving gear 133*b* of a toner carriage screw 133 in the photoconductor unit 100 shown in FIG. 3 via an intermediate gear 520 and a reduction gear 521 and hereby, the toner carriage screw 133 is rotated.

As shown in FIG. 4, the shaft 321 of the primary transfer roller 320 is supported by the frame 301 via a pair of bearing members 322 so that the primary transfer roller can be rotated. An electrode plate 323 for applying voltage to the primary transfer roller 320 is supported by screwing its long hole 323*a* to a tapped hole 302 provided to the frame 301. The bearing member 322 is supported by a concave portion 303 provided to the frame 301 so that the bearing member can be slid (can be moved vertically in FIG. 4), and a compression coil spring 324 as pressing means is provided between the bearing member 322 and the frame 301.

Therefore, the primary transfer roller 320 is pressed onto the photoconductive drum 110 via the intermediate transfer belt 360 because the both ends of the shaft 321 are respectively pressed by the pair of compression coil springs 324.

The wrinkle removing roller 330 is supported on the frame 301 by its shaft 331 so that the wrinkle removing roller can be rotated.

The tension roller 340 is supported so that its shaft 341 can be rotated and slid in a long hole 304 provided to the frame 301. One end 342*a* of an arm 342 forming a pair at both ends is in contact with the shaft 341. The arm 342 is supported on the frame 301 by its shaft 343 so that the arm can be swung, and a tension spring 344 is provided between the other end 342*b* and the frame 301.

Therefore, the tension roller 340 is pressed via the arm 342 by the tension spring 344 in a direction in which the intermediate transfer belt 360 is always tensed.

The backup roller 350 is supported on the frame 301 by its shaft 351 so that the backup roller can be rotated.

The intermediate transfer belt 360 is extended around the above each roller 310, 320, 330, 340 and 350 and circulated by the driving roller 310 in a direction (clockwise) shown by arrows in FIG. 4.

The cleaning means 370 is provided with a fur brush 371 for brushing toner left and stuck on the peripheral surface of the intermediate transfer belt 360, a cleaner blade 372 for further scratching toner still left and stuck on the peripheral surface of the intermediate transfer belt 360, and a toner carriage screw 373 as carriage means for carrying the toner brushed or scratched by the above fur brush 371 or cleaner blade 372, and the above each member is built in a case 374.

A toner withdrawal chamber 375 is formed in the lower part of the case 374, and the above fur brush 371, cleaner blade 372 and toner carriage screw 373 are arranged in the toner withdrawal chamber 375.

The fur brush 371 is fixed on its shaft 371*a* piercing the side plate of the case 374 and rotated in the direction shown by the arrows in FIG. 4 by the shaft 371*a* being driven by driving means not shown.

The cleaner blade 372 is attached to the case 374 via a mounting plate 372*a* and is constructed so that the end (the lower end) comes in contact with the peripheral surface of the intermediate transfer belt 360 and scratches toner.

The toner carriage screw 373 is rotated in the direction shown by the arrows in FIG. 4 by its shaft 373*a* piercing the side plate of the case 374 being driven by driving means not shown, and carries toner collected in the toner withdrawal chamber 375 to a waste toner box not shown as waste toner.

Its cylindrical part 374*a* provided to both sides of the case 374 is supported on the frame 301 via a bearing member 376 so that the cylindrical part can be rotated.

A hook 377 is attached to both sides at the lower end of the case 374, and a tension spring 378 is provided between the hook 377 and the frame 301.

Therefore, the case 374 is always pressed by the tension spring 378 in a direction (clockwise) in which the fur brush 371 and the cleaner blade 372 press the intermediate transfer belt 360. However, the turn of the case 374 is regulated because a cam 55 is provided to the intermediate transfer unit 300 as shown in FIG. 3 and is in contact with the lower end of the case 374.

The cam 55 is driven by driving means not shown. When the cam is located in a position shown in FIG. 4, it turns the case 374 counterclockwise as shown by an alternate long and short dash line, and detaches the fur brush 371 and the cleaner blade 372 from the intermediate transfer belt 360.

In FIG. 4, reference number 156 denotes a position detecting sensor (see FIG. 3) provided to the body of the image formation apparatus so that the position detecting sensor is opposite to the driving roller 310. The position detecting sensor is provided to detect the position of the intermediate transfer belt 360.

The above intermediate transfer unit 300 is formed so that it can be attached to or detached from the body of the image formation apparatus.

Further, in this embodiment, since various contrivances are made or can be made, they will be described below.

<With Respect to Driving Roller 310>

(1) The outer diameter of the driving roller 310 is constructed so that the peripheral speed of the intermediate transfer belt 360 is slightly (in a range of tolerance) faster than that of the photoconductive drum 110.

It is desirable that the peripheral speed of the photoconductive drum 110 is completely equal to that of the intermediate transfer belt 360 on which a toner image is transferred from the photoconductive drum 110.

However, since there is tolerance between the outer diameter of the photoconductive drum 110 and that of the driving roller 310, it is impossible to equalize the above peripheral speeds completely. In such a status, if the peripheral speed of the intermediate transfer belt 360 at a part in which the intermediate transfer belt is wound on the driving roller 310, is slightly slower than that of the photoconductive drum 110, force which tries to loosen the intermediate transfer belt 360 is applied to the intermediate transfer belt 360 between a position (a primary transfer position T1) in which the photoconductive drum 110 and the primary transfer roller 320 are in contact and the driving roller 310 though the force is very slight. Thus, a state of the intermediate transfer belt 360 in the primary transfer position T1 is made unstable.

In this embodiment, the outer diameter of the driving roller 310 is set so that the peripheral speed of the intermediate transfer belt 360 is slightly (in a range of tolerance) faster than that of the photoconductive drum 110.

When the above structure is made, since the intermediate transfer belt 360 between the position (the primary transfer position T1) in which the photoconductive drum 110 and the primary transfer roller 320 are in contact and the driving roller 310 is always tensed though the tensed quantity is slight, the state of the intermediate transfer belt 360 in the primary transfer position T1 is stabilized.

The deflective quantity of the peripheral surface of the driving roller 310 is set to ±0.05 mm or less.

(2) The intermediate transfer belt 360 is constructed so that the period is equivalent to the integer-fold period of the driving roller 310.

The quantity of dislocation caused by the deflection of the shaft or peripheral surface of the driving roller 310 between/among toner images of each color overlapped on the intermediate transfer belt 360 can be reduced by constructing as described above.

Concretely, the above ratio is set to 5 to 1.

(3) The intermediate transfer belt 360 is constructed so that the period is equivalent to the integer-fold period of the photoconductive drum 110.

The quantity of dislocation caused by the deflection of the shaft or peripheral surface of the photoconductive drum 110 between/among toner images of each color overlapped on the intermediate transfer belt 360 can be reduced by constructing as described above.

Concretely, the above ratio is set to 2 to 1.

(4) The angle of the contact of the intermediate transfer belt 360 with the driving roller 310 is set to 90° or more so that the angle of the contact is larger than the angle of the contact with the other roller.

The intermediate transfer belt 360 can be stably driven by constructing as described above even if a friction coefficient between the driving roller 310 and the intermediate transfer belt 360 is small or the friction coefficient is reduced because of long-term use.

Concretely, the above angle of the contact is set to approximately 151°.

To increase the above friction coefficient, urethane coating is applied to the peripheral surface of the driving roller 310.

<With Respect to Backup Roller 350>

For a method of separating the intermediate transfer belt 360 and a recording medium S at a part in which the backup roller 350 and the secondary transfer roller 380 are in contact, that is, a secondary transfer part T2 shown in FIG. 4, a curvature separating method is adopted. The diameter of the backup roller 350 is set to 35 mm or less, and the angle of the contact of the intermediate transfer belt 360 with the backup roller 350 is set to 90° or more.

A recording medium S is securely separated from the intermediate transfer belt 360 by constructing as described above.

It is desirable that the diameter of the backup roller 350 is set to 30 mm or less and the angle of the contact of the intermediate transfer belt 360 with the backup roller 350 is set to 105° or more. Concretely, the above diameter is set to 30 mm and the above angle of the contact is set to 109°.

It is desirable that the surface resistivity of the intermediate transfer belt 360 is set to $10^{12}$ Ω or less.

<With Respect to Cleaning Means 370>

(1) The tension roller 340 is put closer to the side of the cleaning means 370 in a horizontal direction as compared with the backup roller 350, and a part of the toner withdrawal chamber 375 is open under a part in which the fur brush 371 and the intermediate transfer belt 360 are in contact.

According to the above construction, toner brushed down by the fur brush 371 is readily collected in the toner withdrawal chamber 375.

It is desirable that an angle θ between the intermediate transfer belt 360 and a vertical line V between the tension roller 340 and the backup roller 350, that is, an angle e between a common tangent of the tension roller 340 and the backup roller 350 and a vertical line V is set to 10° or more, and it is more preferable that the above angle is set to 15° or more.

According to the above construction, toner brushed down by the fur brush 371 is more securely and more readily collected in the toner withdrawal chamber 375, and toner dropped when the cleaning means 370 is detached from the intermediate transfer belt 360 is also more readily collected in the toner withdrawal chamber 375.

(2) The tension roller 340 also functions as means for receiving the pressure of the cleaning means 370 upon the intermediate transfer belt 360.

The manufacturing cost can be reduced by constructing as described above. Since another tension roller is not required to be provided and the number of rollers can be reduced, the angle of the contact of the intermediate transfer belt with each roller is increased.

<With Respect to Wrinkle Removing Roller 330>

The wrinkle removing roller 330 is arranged on the upstream side close to the primary transfer position T1 in a direction in which the intermediate transfer belt 360 is circulated, and the angle of the contact of the intermediate transfer belt 360 with the wrinkle removing roller 330 is set to 10° or more.

A wrinkle formed on the intermediate transfer belt 360 between the tension roller 340 and the wrinkle removing roller 330 (a wavy state when viewed from the wrinkle removing roller 330 to the tension roller 340) is removed by the wrinkle removing roller 330, and the intermediate transfer belt 360 in the primary transfer position T1 can be smoothed respectively by constituting as described above.

It is desirable that the angle of the contact of the intermediate transfer belt 360 with the wrinkle removing roller 330 is set to 15° or more. Concretely, the above angle is set to 17.6°.

Means for changing the proceeding direction of the intermediate transfer belt 360 by 10° or more, such as a guide plate, may be provided in place of the wrinkle removing roller 330.

<With Respect to Primary Transfer Position T1>

(1) The driving roller 310, the primary transfer roller 320 and the wrinkle removing roller 330 are arranged so that the intermediate transfer belt 360 is straight tensed in a direction of a tangent to the photoconductive drum 110 at the primary transfer position T1.

A transfer nip can be stabilized without depending upon belt tension by constructing as described above. If the intermediate transfer belt 360 is wound on the primary transfer roller 320 and the primary transfer position T1 is formed at the wound part, the variation of the tension of the intermediate transfer belt 360 has a large effect upon the primary transfer position T1. However, the above effect can be reduced by constructing so that the intermediate transfer belt 360 is tensed in a direction of a tangent to the photoconductive drum 110 without winding the intermediate transfer belt 360 on the primary transfer roller 320.

(2) The primary transfer position T1 is arranged close to the driving roller 310.

If distance between the primary transfer position T1 and the driving roller 310 is large, the shrinkage of the intermediate transfer belt 360 between them is increased and the travel speed of the intermediate transfer belt 360 in the primary transfer position T1 becomes unstable.

In this embodiment, the travel speed of the intermediate transfer belt 360 at the primary transfer position T1 is stabilized by arranging the primary transfer position T1 close to the driving roller 310.

It is desirable that distance L1 shown in FIG. 4 between the primary transfer position T1 and the driving roller 310 is set to 40 mm or less, and it more is preferable that the above distance is set to 35 mm or less. Concretely, the distance is set to approximately 30.5 mm.

(3) For the length of the straight part of the intermediate transfer belt 360 from the wrinkle removing roller 330 to the driving roller 310, the aspect ratio is set to 0.25 or less. It is more preferable that it is set to 0.15 or less.

It is because the above effect by a wrinkle can be more effectively inhibited.

Concretely, the length of the above straight part is set to approximately 55.5 mm.

<With Respect to Positional Detection>

As described above, the position detecting sensor 56 is arranged opposite to the driving roller 310 to detect the position of the intermediate transfer belt 360 on the driving roller 310.

Hereby, the travel cycle of the intermediate transfer belt 360 can be precisely detected.

The position detecting sensor 56 is constituted by a reflector type optical sensor and a mark to be detected by the position detecting sensor 56 is provided on the intermediate transfer belt 360 by printing.

When the position detecting sensor is constituted by a transmitted light sensor and a hole to be detected by the sensor is made on the intermediate transfer belt 360, stress is centralized in the hole and the hole is deformed so that precise detection may be impossible. However, in this embodiment, since the position detecting sensor 56 is constituted by a reflector type optical sensor and a mark to be detected by the sensor is provided on the intermediate transfer belt 360 by printing, the travel cycle of the intermediate transfer belt 360 can be precisely detected.

<With Respect to Construction in Which the Intermediate Transfer Belt 360 is Tensed and Extended>

For construction in which the intermediate transfer belt 360 is tensed, the length of the intermediate transfer belt 360 from the primary transfer position T1 to the secondary transfer position T2 is set to the length in the transverse direction of A4-sized paper or longer, and the length of the intermediate transfer belt 360 from the secondary transfer position T2 to the primary transfer position T1 is also set to the length in the transverse direction of A4-sized paper or longer. That is, the intermediate transfer belt 360 is tensed and extended to realize the length described above.

According to the above construction, when printing on A4-sized paper is continuously executed, timing at which the secondary transfer roller 380 is touched to the intermediate transfer belt 360 can be set in the unit of paper, that is, the secondary transfer roller 380 can be prevented from being touched to the intermediate transfer belt during primary transfer.

When the secondary transfer roller 380 is touched to the intermediate transfer belt 360 during primary transfer, an image by primary transfer may be deformed by the shock. However, such a situation can be prevented by constructing as described above.

<With Respect to Cleaning Means 370>

(1) The cleaner blade 372 is made of urethane rubber, the free length is set to approximately 8 mm, the thickness is set to approximately 3 mm, the Young's modulus is set to approximately 7 to 9 MPa, the holder angle (an angle between the blade in a state of no load and the tangent of the roller in the contact position) is set to approximately 20°, and the contact pressure on the intermediate transfer belt 360 is set to approximately 45 gf/cm.

According to the above construction, cleaning failure caused by the passage of toner through the blade, the vibration and lifting of the blade can be prevented.

(2) The waste toner box is provided apart from the case 374.

Since a large quantity of waste toner can be prevented from being collected in the case 374 according to the above construction, the variation of load when the case 374 is swung and force operating on the case 374 after the case is swung, can be reduced. As a result, the contact pressure of the cleaner blade 372 on the intermediate transfer belt 360 can be stabilized.

(3) The shaft 373*a* (see FIG. 4) of the toner carriage screw 373 is located in the center of the turning of the case.

According to the above construction, relative positional relationship between the case and the other fixed member, for example between the waste toner carriage port of the case 374 and the toner receiving port of the waste toner box is readily secured.

(4) The cam 155 is constituted by a SIN cam.

Shock applied to the intermediate transfer belt 360 can be reduced by constituting as described above.

<With Respect to Patch Sensing>

Patch sensing, that is, the detection of toner quantity in trial printing is executed on the intermediate transfer belt 360 on the driving roller 310.

The above patch sensing can be executed at a place in which the angle of contact is large and speed is stable by constructing as described above.

<With Respect to Bead>

A bead is a bump provided on the rear of the intermediate transfer belt 360 along the circulated direction and the position (in the direction of the axis of each roller) of the belt is regulated by fitting the beads into a concave groove (a regulating groove) formed on each roller on which the belt is wound.

The above beads are not necessarily provided and in the embodiment shown in FIG. 4, they are also not provided. If they are provided, they are to be constructed as follows:

(1) Silicon rubber is used for the bead, the thickness (the height of protrusion) is set to approximately 1.5 mm, and the width is set to approximately 4 mm.

(2) The coefficient of friction between the bead and the regulating groove is set so that it is smaller than that between the base material of the intermediate transfer belt 360 and any roller.

The occurrence of a tension inclination in the axial direction of the belt by frictional force between the bead and the regulating groove can be reduced by constructing as described above.

The coefficient of friction between the base material of the intermediate transfer belt 360 and any roller is approximately 0.4.

(3) The elastic strength of the bead is set to approximately 2.0 to 8.0 MPa.

It is because when the bead is too soft, stress against thrust in a regulating part is applied to only one place, that is, a small range in which the bead is bonded.

On the contrary, it is because when the bead is too hard, the effect of the bead upon the bent part of the belt is too large.

It is desirable that if t1 means the thickness of the belt, t2 means the thickness of the bead, and E1 means Young's modulus (up to $4.0\times10^3$ MPa) of the belt, the elastic strength of the bead is set to $\{1.0 \text{ to } (t1/t2)^2\}$ E1 [MPa].

(4) The bead regulating groove is provided to each roller witch is not adjacent to the primary transfer position T1.

According to the above construction, dislocation between/among toner images of each color overlapped on the intermediate transfer belt 360 can be reduced by the random variation by contact between the bead and the regulating groove of the intermediate transfer belt 360.

For example, the bead regulating groove is constructed by attaching a stepped flange to the end of the backup roller 350.

(5) The regulating groove is formed so that the width is slightly larger than that of the bead and the regulating groove has a margin for the straightness of adhesion of the bead.

For example, if the width of the bead is approximately 4 mm, that of the regulating groove is set to approximately 4.2 mm.

<With Respect to Replacement and Handling of Intermediate Transfer Unit 300>

(1) The intermediate transfer unit 300 is constructed so that the intermediate transfer belt 360 does not come in contact with the surface of a desk and others when the intermediate transfer unit 300 is put on the desk and others. Thus, the intermediate transfer belt 360 is prevented from being damaged or a foreign matter is prevented from adhering onto the intermediate transfer belt.

(2) The intermediate transfer unit 300 is constructed so that a drive transmission part such as the gear 311 does not come in contact with the surface of a desk and others when the intermediate transfer unit 300 is put on the desk and others. Thus, the deformation and damage of the drive transmission part are prevented.

(3) The electrode part of the intermediate transfer unit 300 is provided on the reverse side of the drive transmission part, so that an electrode is prevented from being stained and the failure of a contact is prevented.

(4) The intermediate transfer unit 300 is constructed so that the photoconductor unit 100 cannot be installed when the intermediate transfer unit 300 is not installed. Thus, erroneous attachment is prevented.

(5) The intermediate transfer unit 300 is constructed so that the capacity of the waste toner box is related to the life of the intermediate transfer belt 360 and the waste toner box is also replaced when the intermediate transfer unit 300 is replaced. Thus, the handling is enhanced.

<With Respect to Sequence>

(1) When the position of the intermediate transfer belt 360 as the basis of exposure writing timing is detected, bias for primary transfer is applied, that is, bias for primary transfer is applied before detecting the position.

The load of each four color onto the intermediate transfer belt 360 in the primary transfer position T1 from the detection of the position to primary transfer is approximately equal, and dislocation (called misregistration) among toner images of each color overlapped on the intermediate transfer belt 360 can be inhibited by setting as described above.

(2) The position of the mark for detecting the position when the intermediate transfer belt 360 is stopped, is set so that it is located on the upstream side of the primary transfer position T1. For example, the above position on the upstream side is a position shown by M in FIG. 4.

Since the position is detected when the tension of the intermediate transfer belt 360 is stable because of the application of bias in the initial circulation of the intermediate transfer belt 360, misregistration caused by the dislocation of the period can be avoided by setting as described above.

<With Respect to Frame 301 of Intermediate Transfer Unit 300>

The side plate of the frame 301 is constituted by an insulating member so that the insulation to a roller shaft for applying bias to a roller (and/or a bearing member) is not required.

The coefficient of the thermal expansion of the frame 301 is approximately equalized to that of the intermediate transfer belt 360 by using acrylonitrile butadiene styrene resin (ABS resin) as the above insulating member, and relative misregistration due to the change of temperature can be prevented.

[Embodiments]

Further concrete embodiments will be described below.

The following description is mainly related to a transfer process:

<For Stabilizing the Efficiency of Primary Transfer>

(1) A high-voltage power source which has constant-current control when the impedance of primary transfer is large (approximately 30 MΩ or more) and has constant-voltage control when the impedance is small (approximately 30 MΩ or less), is used.

Hereby, even if there is dispersion in the quantity (film thickness) of toner, environment, and the resistance of a member, transfer is satisfactorily executed.

(2) The surface resistivity of the intermediate transfer belt 360 is set to $10^8$ to $10^{12}$ Ω/□ and the volume resistivity is set to $10^8$ to $10^{12}$ Ωcm.

The primary transfer roller 320 is made of urethane in which carbon is dispersed, the resistance thereof is set to $10^6$ to $10^8$ Ω (desirably approximately $10^7$ Ω), the hardness is set to 45±5°, and the load onto the photoconductive drum 110 by the primary transfer roller is set to 1.0 to 3.5 kg (desirably approximately 2.5 kg).

Transfer is enabled at 1200 V or less by setting the resistance value to the above range.

The occurrence of a so-called void can be prevented by setting the hardness and the load to the above range.

(3) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %).

The additive with a large particle diameter is mainly required to enhance the stability of the durability of toner, and in view of the above, the more the quantity of the above additive is, the better it is. However, if the quantity of the above additive exceeds 4.0 wt %, the fluidity of toner is deteriorated, and the occurrence of a void and the like may be caused. Thus, the too much quantity of the above additive is not desirable.

In the meantime, the additive with a small particle diameter is mainly required to enhance transferability on rough paper, and in view of the above, the more the quantity of the above additive is, the better it is. However, if the quantity of the above additive exceeds 4.0 wt %, the photoconductive drum 110 and the intermediate transfer belt 360 are readily filmed with floating silica. Thus, the too much quantity is not desirable.

The deterioration of an image due to interference in simultaneous primary and secondary transfer can be prevented and the capacity of the high-voltage power source can be reduced to the minimum under the conditions described in above (1) to (3).

<For Stabilization of Secondary Transfer Efficiency>

(1) A high-voltage power source which has constant-current control when the impedance of secondary transfer is large (approximately 20 MΩ or more) and has constant-voltage control when the impedance is small (approximately 20 MΩ or less), is, used.

Hereby, even if there is dispersion in the type of paper, environment, and the resistance of a member, transfer is satisfactorily executed.

(2) The surface resistivity of the intermediate transfer belt 360 is set to $10^8$ to $10^{12}$ Ω/□, and the volume resistivity is set to $10^8$ to $10^{12}$ Ωcm.

The secondary transfer roller 380 is an ionic roller, the resistance thereof is set to $10^6$ to $10^8$ Ω, the hardness is set to 60±5°, and the load onto the backup roller 350 by the secondary transfer roller is set to 5.0 to 9.0 kg (desirably approximately 7.0 kg).

Transfer is enabled at 4000 V or less and 200 μA or less by setting the resistance to the above range.

The backup roller 350 is grounded.

(3) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %).

The reason is as described above.

<For Preventing the Rear of Recording Medium S Such as Paper from Being Stained>

When transfer on paper or the transfer of a color is not executed while the secondary transfer roller 380 is in contact with the intermediate transfer belt 360, voltage approximately 0 to −600 V in a direction in which toner is returned to the intermediate transfer belt 360, is applied.

Toner which adheres to the secondary transfer roller 380 is reduced and a stain on the rear of a recording medium S is reduced by constructing as described above.

<For Satisfactorily Transferring on Rough (Bond) Paper>

(1) The hardness of the secondary transfer roller 380 is set to 60±5° and the load onto the backup roller 350 by the secondary transfer roller is set to 5.0 to 9.0 kg (desirably approximately 7.0 kg).

(2) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %).

For toner, high density pigment toner with the particle diameter of approximately 7 μm is used.

(3) The quantity of toner before secondary transfer, that is, the quantity of toner on the intermediate transfer belt 360 is set to 1.5 mg/cm$^2$ or less.

A satisfactory transfer state can be also acquired on rough paper such as bond paper by setting as described in above (1) to (3).

That is, the surface of paper can be touched closely to toner by setting the hardness of the secondary transfer roller 380 to a high value as described above and setting a load onto the secondary transfer roller to a high value. Thus, even if a high electric field is formed, the failure of transfer due to discharge is reduced. A state in which paper is carried is also stabilized by applying the high load.

Further, the transfer efficiency of toner can be enhanced by reducing the quantity of toner before secondary transfer as described above.

<For Preventing the Occurrence of a Void>

(1) The intermediate transfer belt 360 is made of ethylene tetrafluoroethylene (ETFE) in which carbon black and others are dispersed as a conductor, polyethylene terephthalate (PET) generated by depositing aluminum and further coating with urethane paint including fluoric particulates, or polyimide in which carbon black and others are dispersed as a conductor.

The photoconductive drum 110 is made of polycarbonate.

(2) The hardness of the primary transfer roller 320 is set to 45±5° and the load onto the photoconductive drum 110 by the primary transfer roller is set to 1.0 to 3.5 kg.

(3) The hardness of the secondary transfer roller 380 is set to 60±5° and the load onto the backup roller 350 by the secondary transfer roller is set to 5.0 to 9.0 kg.

(4) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %).

The fluidity of toner is set to approximately 0.35 g/cc.

The following function and effect can be acquired by setting as described above:

That is, as for the condition of transfer from the photoconductive drum 110 to the intermediate transfer belt 360 in the primary transfer part, the low hardness, the low load and the high fluidity of toner is used, so that the occurrence of a void is prevented.

For the condition of transfer from the intermediate transfer belt 360 in the secondary transfer part, the high hardness and the high load of toner is used. However, since the intermediate transfer belt 360 is made of fluorine and toner is very fluid, the occurrence of a void is prevented.

<For Reducing the Scattering of Toner>

(1) The wrinkle removing roller 330 is provided close on the upstream side of the primary transfer position T1.

(2) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %).

The fluidity of toner is set to approximately 0.35 g/cc and the quantity of electrostatic charge is set to −10 μC/g or more.

(3) The surface roughness of the intermediate transfer belt 360 is set to Rmax 1 μm (desirably 0.7 μm) or less.

The surface resistivity of the intermediate transfer belt 360 is set to $10^8$ to $10^{12}$ Ω/□, and the volume resistivity is set to $10^8$ to $10^{12}$ Ωcm.

The following function and effect can be acquired by setting as described above:

That is, in the primary transfer part, wrinkles of the intermediate transfer belt 360 are reduced by the wrinkle removing roller 330 and scattering is reduced.

In the secondary transfer part, toner on the intermediate transfer belt 360 is stably carried and scattering is reduced.

<For the Reduction of the Cost>

(1) The intermediate transfer belt 360 without an end is formed by coating a sheet-shaped PET on which aluminum is deposited, with urethane paint in which PEFT particles and SnO as a conductor are dispersed, and by bonding both ends through ultrasonic welding.

Difference in a level made by bonding both ends is set to 50 μm or less and desirably set to 30 μm or less. Young's modulus of the paint is set to approximately $1.5\times10^4$ kgf/$cm^2$. The surface resistivity of the paint is set to approximately $10^8$ to $10^{12}$ Ω/□ and the surface roughness is set to Rmax 1 μm (desirably 0.7 μm) or less. As for the construction of an electrode, a conductive layer is printed on the surface of aluminum at an end, and bias is applied by a roller electrode (1 MΩ or less).

(2) The high-voltage power source has current absorption type constant-voltage control in the primary transfer part, and applies primary transfer voltage until secondary transfer is finished.

The efficiency of transfer and the property of cleaning can be enhanced by setting as described in above (1) and (2).

The primary transfer roller functions only as the backup roller and it is not required to fulfill the function as an electrode.

Further, the deterioration of an image due to interference in simultaneous primary and secondary transfer can be avoided by constructing the electrode and the power source as described above.

As described above, according to the intermediate transfer unit, the shrinkage of the intermediate transfer belt between the primary transfer position and the driving roller is reduced, so that the travel speed of the intermediate transfer belt in the primary transfer position is stable and as a result, primary transfer in a satisfactory state can be readily acquired.

Although the embodiments or examples of the present invention are described above, the present invention is not limited to the above embodiments or examples and may be suitably varied in the range of the gist of the present invention.

For example, the following modifications are possible.

<For Satisfactorily Transferring on Rough Paper (Bond Paper)>

(1) The outer diameter of the elastic body of the secondary transfer roller 380 is set to 25 mm, the outer diameter of the shaft is set to 15 mm, the length of the elastic body in the direction of the shaft is set to 332 mm, the hardness of the secondary transfer-roller is set to 60±10° (desirably approximately 60±5°), and the load onto the backup roller 350 by the secondary transfer roller is set to 5.0 to 9.0 kg (or 15 gh/mm to 27 gf/mm), and desirably to approximately 7.0 kg (or approximately 21 gf/mm).

(2) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %). The surface coverage can be calculated according to the following expression 1, and the surface coverage for toner with a mother particle diameter of 7 μm in which silica with a particle diameter of 40 nm is added by 0.7 wt % and silica with a particle diameter of 9 nm is added by 2.0 wt %, is 2.8.

$$\text{Surface coverage}_\gamma = \sum_{i=1}^{n}\left(\frac{1}{\pi}\frac{R}{r_i}\frac{\rho}{\rho_i}\frac{W_i}{100}\right) \quad \text{[Expression 1]}$$

R: Outer diameter of toner mother particle ri: Outer diameter of additive i

ρ: Density of toner mother particle

ρi: Density of additive i

Wi: Quantity (wt %) of additive i added to toner mother particle i: 'i'th additive n: Number of types of additives (3) The quantity of toner before secondary transfer, that is, the quantity of toner on the intermediate transfer belt 360 is set to 1.5 mg/$cm^2$ or less.

A satisfactory transfer state can be also acquired on rough paper such as bond paper, the surface of which is a rough, of recording medium by setting as described in above (1) to (3).

That is, if the linear pressure of the secondary transfer roller 380 is set to 20 gf/mm or more, a sufficient electric field can be formed in a toner layer by adjusting a concave portion of rough (bond) paper to a toner image on the intermediate transfer belt 360 and bringing the concave portion close to the toner image, and the failure of transfer due to discharge in a high electric field is reduced. Further, when the hardness of the secondary transfer roller 380 is set to 50° or more in case the hardness is measured by Asker-C hardness meter, no increase of torque by excessive nip width occurs and a state in which paper is carried is also stabilized by a stable nip.

Further, since the fluidity of toner is secured and the adhesive strength to the intermediate transfer belt can be reduced by adding an additive with a small particle diameter so that the surface coverage of the additive for toner is 2.0 or more, the efficiency of transfer on rough paper can be enhanced. Further, an additive is hardly embedded in a toner mother particle or hardly peeled in long-term use by adding the additive with a large particle diameter as described above, and the enhancement of the durability and transferability on rough paper are compatible.

Further, the transfer efficiency of toner can be enhanced by reducing the quantity of toner before secondary transfer as described above. That is, if a primary transfer image consisting of overlapped two layers of solid images on the photoconductive drum is transferred on rough paper, potential difference to be applied between the surface of the intermediate transfer medium and the surface of a recording medium can be reduced and the failure of transfer due to discharge can be avoided by setting the total quantity of toner in the primary transfer image to 1.5 mg/$cm^2$ or less.

<For Preventing the Occurrence of a Void>

(1) The intermediate transfer belt 360 is made of ethylene tetrafluoroethylene (ETPE) in which carbon black and others are dispersed as a conductor, polyethylene terephthalate (PET) generated by depositing aluminum and further coating with urethane paint including fluoric particulates, or polyimide in which carbon black and others are dispersed as a conductor.

The photoconductive drum 110 is made of polycarbonate.

(2) The outer diameter of the elastic body of the primary transfer roller 320 is set to 22 mm, the outer diameter of the shaft is set to 12 mm, the length of the elastic body in the direction of the shaft is set to 358 mm, the hardness of the primary transfer roller 320 is set to 45±5°, and the load onto the photoconductive drum 110 by the primary transfer roller is set to 1.0 to 3.5 kg.

(3) The outer diameter of the elastic body of the secondary transfer roller 380 is set to 25 mm, the outer diameter of the shaft is set to 15 mm, the length of the elastic body in the direction of the shaft is set to 332 mm, the hardness of the secondary transfer roller 380 is set to 60±10° (desirably approximately 60±5°), and the load onto the backup roller 350 by the secondary transfer roller is set to 5.0 to 9.0 kg (or 15 gf/mm to 27 gf/mm), and desirably to approximately 7.0 kg (or approximately 21 gf/mm).

(4) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %). The surface coverage can be calculated according to the expression 1, and the surface coverage of the additive for toner with a mother particle diameter of 7 $\mu$m in which silica with a particle diameter of 40 nm is added by 0.7 wt % and silica with a particle diameter of 9 nm is added by 2.0 wt %, is 2.8.

The fluidity of toner is set to approximately 0.35 g/cc.

By setting as in above (1) to (3), a satisfactory transfer state can be also acquired on a recording medium such as OHP the surface of which is smooth.

That is, as for the condition of transfer from the photoconductive drum 110 to the intermediate transfer belt 360 in the primary transfer part, the low hardness, the low load and the high fluidity of toner is used, so that the occurrence of a void is prevented.

For the condition of transfer from the intermediate transfer belt 360 in the secondary transfer part, the high hardness and the high load of toner is used. However, since the intermediate transfer belt 360 is made of fluorine and can be readily released from a mold, the occurrence of a void is prevented.

Further, since the concentration of transfer pressure upon a linear image on the intermediate transfer belt 360 is avoided because the hardness of the secondary transfer roller is set to 70° or less in case the hardness is measured by Asker-C hardness meter, the occurrence of a void is prevented.

Further, since the fluidity of toner is secured and the adhesive strength to the intermediate transfer belt can be reduced by adding an additive with a small particle diameter so that the surface coverage of the additive for toner is 2.0 or more, the occurrence of a void is prevented. Further, an additive is hardly embedded in a toner mother particle or hardly peeled in long-term use by adding the additive with a large particle diameter as described above, and the enhancement of the durability and transferability on rough paper are compatible.

Further, since the height of a toner layer is limited by reducing the quantity of toner before secondary transfer as described above, pressure upon toner is equalized and the occurrence of a void is prevented.

<For Preventing the Rear of Recording Medium S Such as Paper from Being Stained>

When the secondary transfer roller 380 is directly touched to the intermediate transfer belt 360, an electric field in a direction in which toner is returned from the secondary transfer roller 380 to the intermediate transfer belt 360 (for example, the voltage of approximately 0 to −600 V) is applied to the secondary transfer roller 380, and when the joint of the intermediate transfer belt 360 is located in the secondary transfer position T2, the secondary transfer roller 380 is detached.

Toner which adheres to the secondary transfer roller 380 is reduced and a stain which adheres to the rear of a recording medium S is reduced by setting as described above. That is, although toner which cannot be removed by the cleaning means 370 is left in a step portion of the joint of the intermediate transfer belt 360, since the secondary transfer roller 380 is not directly touched to the portion and the secondary transfer roller 380 can be cleaned at other part by bias, a stain by toner on the secondary transfer roller 380 can be reduced and hereby, a stain on the rear of a recording medium can be reduced.

Further, according to the intermediate transfer unit of the invention, it is possible to prevent a phenomenon in which toner adheres to the secondary transfer roller by directly touching the secondary transfer roller to the joint of the intermediate transfer medium, and therefore, the rear of a recording medium can be prevented from being stained, and the intermediate transfer unit for enabling satisfactory transfer can be readily obtained.

Further, according to the intermediate transfer unit of the invention, since the intermediate transfer belt has excellent mold releasing properties, toner is readily released in secondary transfer. Further, since the hardness of the secondary transfer roller is set to 70° or less in case the hardness is measured by Asker-C hardness meter, the concentration of transfer pressure upon a linear image on the intermediate transfer belt 360 can be avoided and as a result, when a thin line image is transferred on a recording medium the surface of which is smooth, the occurrence of a so-called void can be reduced.

Further, according to the intermediate transfer unit of the invention, since toner is covered with sufficient quantity of additives, the force of toner which adheres to the intermediate transfer belt can be reduced. Further, since a recording medium the surface of which is rough is pressed on the intermediate transfer belt under sufficient linear pressure, a concave portion of the recording medium can be brought close to a toner image on the intermediate transfer belt and as a result, a satisfactory transfer state can be also acquired for rough paper such as bond paper which is a recording medium the surface of which is rough.

The present invention may be further modified as follows.

<For Stabilizing the Efficiency of Primary Transfer>

(1) A high-voltage power source which has constant-current control when the impedance of primary transfer is large (approximately 30 MΩ or more) and has constant-voltage control when the impedance is small (approximately 30 MΩ or less) is used.

Hereby, even if there is dispersion in the quantity (film thickness) of toner, environment, and the resistance of a member, transfer is satisfactorily executed.

(2) The surface resistivity of the intermediate transfer belt 360 is set to $10^8$ to $10^{12}$ Ω/□, and the volume resistivity is set to $10^8$ to $10^{12}$ Ωcm.

The primary transfer roller 320 is a roller with the diameter of 22 mm in which an elastic layer made of urethane resin in which carbon is dispersed, is formed on the peripheral surface of a metallic shaft with the diameter of 12 mm. The resistance of the roller is set to $10^6$ to $10^8$ (desirably approximately $10^7$ Ω), the hardness is set to 45±5°, and the load onto the photoconductive drum 110 by the primary transfer roller is set to 1.0 to 3.5 kg (desirably approximately 2.5 kg).

Transfer is enabled at 1200 V or less by setting the resistance value to the above range.

The occurrence of a so-called void can be prevented by setting the hardness and the load to the above range.

Hardness is measured by Asker-C hardness meter known to a skilled person. Such a hardness meter is called an indentation hardness meter and it is to be noted that the thickness of an elastic layer has an effect upon the value of hardness measured by such a hardness meter. Hardness described in the present invention does not denote the result of measuring the hardness of an elastic body itself constituting an elastic layer but denotes the result of measurement in a state in which an elastic layer is formed on a roller.

(3) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %).

The additive with a large particle diameter is mainly required to enhance the stability of the durability of toner, and in view of the above, the more the quantity of the above additive is, the better it is. However, if the quantity of the above additive exceeds 4.0 wt %, the fluidity of toner is deteriorated. That is, the too much quantity of the above additive causes the occurrence of a void and others, and is not desirable.

In the meantime, the additive with a small particle diameter is mainly required to enhance transferability on rough paper, and in view of the above the more the quantity of the above additive is, the better it is. However, if the quantity of the above additive exceeds 4.0 wt %, the photoconductive drum 110 and the intermediate transfer belt 360 are readily filmed with floating silica so that it is not desirable.

The deterioration of an image due to interference in simultaneous primary and secondary transfer can be prevented and the capacity of the high-voltage power source can be reduced to the minimum under the conditions described in above (1) to (3).

(4) The particle diameter of toner is set to 9 μm or less.

It is because if the particle diameter is 9 μm or more, the resolution is deteriorated.

Figure 6B:
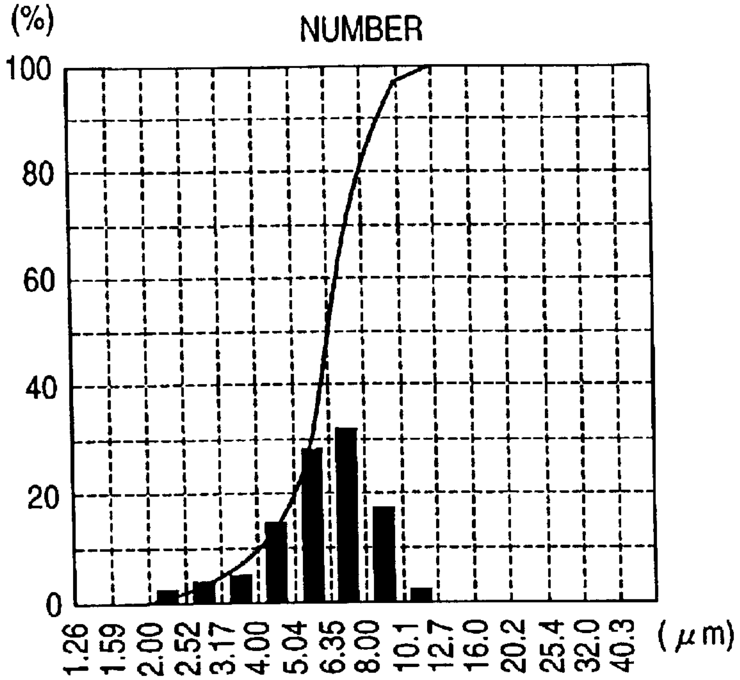
FIGS. 6(*a*) to 6(*c*) show an example of the particle size distribution of toner in the present invention.
Figure 6C:
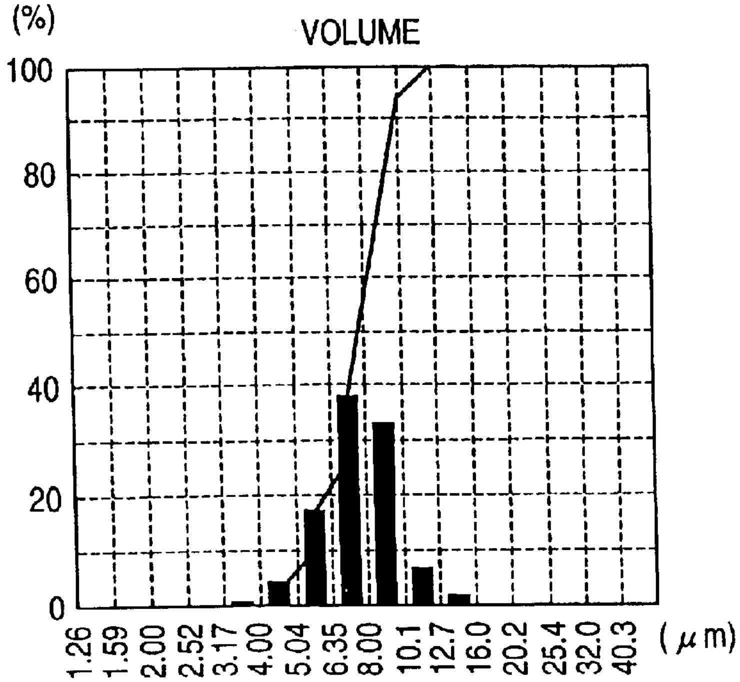

FIGS. 6(*a*) to 6(*c*) show the particle size distribution of toner used this time. The particle size distribution of the above toner is measured using a coal-tar counter model TA-II. The aperture is 100 μm and for an electrolyte, ISOTON-II is used.

In a table shown in FIG. 6(*a*), the number is shown in the right field, the volume is shown in the left field, the result of measurement is shown in the lower column, and a value calculated based upon the result of the measurement is shown in the upper column. However, the above volume means volume in case a measured toner particle is regarded as a sphere.

In graphs shown in FIGS. 6(*b*) and 6(*c*), a bar graph shows numeral data and a linked line graph shows cumulative data.

In the table shown in FIG. 6(*a*), the meaning of each item showing the result of measurement in the lower column is as follows:

DIF N: Most basic data and shows numeral data (data showing number of toner) input from I/O device every channel.

DIF %: Shows above numeral data (DIF N) every channel by %.

CUM N: Shows data acquired by accumulating above numeral data (DIF N).

CUM %: Shows data acquired by accumulating above DIF %.

The meaning of each item showing a calculated value in the upper column is as follows:

25.4 μl: Shows cumulative % value of 25.4 μm or more.

6.35 μl: Shows cumulative % value of 6.35 μm or less.

KURTOSIS: Shows kurtosis of distribution. An image which is satisfactory in transferability and the resolution of which is never deteriorated, can be acquired by setting the particle size distribution in volume to 0.8 or more and setting the particle size distribution in number to 0.3 or more.

SKEWNESS: Shows skewness of distribution. An image which is satisfactory in transferability and the resolution of which is never deteriorated, can be acquired by setting the skewness to 0.6 or less in an absolute value in the particle size distribution in volume, and setting the skewness to 0.1 or less in an absolute value in the particle size distribution in number.

MEAN: Shows arithmetic means particle size.

25%: Shows value of particle size when cumulative % reaches 25%. (see the graphs shown in FIGS. 6(*b*) and 6(*c*).)

50%: Shows value of particle size when cumulative % reaches 50%. (see the graphs shown in FIGS. 6(*b*) and 6(*c*).)

75%: Shows value of particle size when cumulative % reaches 75%. (see the graphs shown in FIGS. 6(*b*) and 6(*c*).)

CV %: Coefficient (%) of variation An image which is satisfactory in transferability and the resolution of which is never deteriorated, can be acquired by setting both particle size distribution in volume and particle size distribution in number to 28% or less.

SDμ: Standard deviation (μm)

(5) Shape of Toner

As for the shape factor of toner, 100 pieces of toner images magnified up to 500 magnifications are sampled at random using FE-SEM (S-800) manufactured by Hitachi, Ltd. for example, the image information is analyzed via an interface by an image analyzer Luzex III by Nireco, Ltd. for example, and values calculated according to the following expressions are defined as a shape factor.

Shape factor (SF-1)=$(MXLNG)^2$/AREA×π/4×100

Shape factor (SF-2)=$(PERI)^2$/AREA×¼π100

In the above expressions, MXLNG means the absolute maximum length of toner, PERI means the peripheral length of toner, and AREA means the projected area of toner.

The shape factor SF-1 shows the degree of the roundness of toner, and the shape factor SF-2 shows the degree of the irregularity of toner. It is desirable that the shape factor SF-1 of toner is 100 to 150, and it is more preferable that SF-1 is 100 to 130. It is desirable that the shape factor SF-2 of toner is 100 to 140, and it is more preferable that SF-2 is 100 to 125. Transfer efficiency in primary and secondary transfer is enhanced by setting the shape factors SF-1 and SF-2 as described above.

In the embodiment of the present invention, since primary or secondary transfer means which functions as a transfer electrode for applying transfer voltage to a transfer position, is in contact with each transfer position even if toner with the high fluidity of A.D 0.35 g/cc or more is used, a transfer electric field in each transfer position can be concentrated upon the transfer position. Further, transfer means is pressed in each transfer position, and toner the shape of which is approximately spherical and the surface of which is smooth, is used. Thus, a toner image can be readily compressed in the direction of the height in a transfer position so that cohesion among toner is enhanced. As a result, transfer efficiency is enhanced and simultaneously, the occurrence of a void can be more satisfactorily prevented. The turbulence of a toner image due to mechanical force caused by slight difference in speed between the photoconductive drum or a recording medium and the intermediate transfer belt in a transfer position and others, can be also satisfactorily prevented.

There is also effect that since a toner image can be readily compressed in the direction of the height without causing the turbulence of an image, the melting of each toner is accelerated and an image satisfactory in coloring and transparency can be formed when a toner image is fixed on a recording medium.

<For the Stabilization of Secondary Transfer Efficiency>

(1) A high-voltage power source which has constant-current control when the impedance of secondary transfer is large (approximately 20 MΩ or more) and has constant-voltage control when the impedance is small (approximately 20 MΩ or less), is used.

Hereby, even if there is dispersion in the type of paper, environment, and the resistance of a member, transfer is satisfactorily executed.

(2) The surface resistivity of the intermediate transfer belt 360 is set to $10^8$ to $10^{12}$ Ω/□, and the volume resistivity is set to $10^8$ to $10^{12}$ Ωcm.

The secondary transfer roller 380 is a roller 25 mm in diameter in which an elastic layer formed by dispersing or melting ion conductive material such as lithium perchlorate in urethane resin, is formed on the peripheral surface of the metallic shaft 15 mm in diameter. The resistance of the roller is set to $10^6$ to $10^8$ Ω, the hardness is set to 60±5°, and the load onto the backup roller 350 by the secondary transfer roller is set to 5.0 to 9.0 kg (desirably approximately 7.0 kg).

Transfer is enabled at 4000 V or less and 200 μA or less by setting the resistance to the above range.

Hardness is measured by Asker-C hardness meter known to a skilled person, and as described above, hardness described in the present invention dose not denote the result of measuring an elastic body itself constituting an elastic layer but denotes the result of measurement in a state in which an elastic layer is formed into a roller.

The backup roller 350 is grounded.

(3) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %).

The reason is as described above.

<For Preventing the Occurrence of a Void>

The durability of the intermediate transfer belt can be enhanced by setting the load of the secondary transfer means so that it is larger than that of the primary transfer means. This is based upon the inventors' knowledge that the filming of toner to the intermediate transfer belt is caused by the additive of toner left on the intermediate transfer belt and embedded in the intermediate transfer belt by the cleaning means such as the cleaning blade for cleaning the surface of the intermediate transfer belt; the isolation of an additive often occurs in overlapping colors in order in primary transfer; since an additive which is isolated from toner and adheres to the intermediate transfer belt again adheres to relatively soft toner and a relatively soft fiber of paper as compared with the intermediate transfer belt when the above additive is pressed by a load exceeding a fixed one under toner or paper, the additive can be removed from the intermediate transfer belt.

Generally, the primary transfer roller 320 is always pressed on the intermediate transfer belt 360 and in the meantime, the secondary transfer roller 380 is pressed on the intermediate transfer belt 360 when a full color image in which overlapping colors is finished, is transferred. However, the secondary transfer roller is detached from the intermediate transfer belt 360 while images of each color are formed in order. However, since there occurs a phenomenon (so-called reverse transfer) in which a part of an image of the 'n'th color is returned from the intermediate transfer belt to the photoconductive drum when an image of the ('n'+1)th color is overlapped on the image of the 'n'th color already formed on the intermediate transfer belt if the load of the primary transfer roller 320 is set to a load exceeding a load by which an isolated additive on the intermediate transfer belt can be removed by toner in the above constitution, it is desirable that the load of the secondary transfer roller 380 is set to a load fixed or more and in the meantime, the load of the primary transfer roller 320 is set to a load fixed or less. A load (a load required to remove an additive from the intermediate transfer belt under toner) acquired in an experiment according to the embodiment of the present invention is 150 g/cm or more and it is desirable that the above load is 200 g/cm or more.

To prevent reverse transfer from occurring in primary transfer, a load acquired in an experiment according to the embodiment of the present invention is 100 g/cm or less and it is desirable that the above load is 70 g/cm or less.

Therefore, the ratio of the respective loads of the primary transfer means and the secondary transfer means is 1.5 or more, and it is more desirable that the above ratio is 2 or more.

To prevent the primary and secondary transfer rollers from being bent due to a load, the shaft of each roller is required to be provided with rigidity according to the load and therefore, it is desirable that the outer diameter of the shaft of the secondary transfer roller is larger than that of the primary transfer roller.

According to the intermediate transfer unit of the present invention, the occurrence of a void in transfer is prevented, satisfactory transfer on rough paper can be realized and further, the durability of the intermediate transfer belt can be enhanced.

The following modification is also possible.

<For Preventing the Occurrence of a Void>

Since resonance between the primary transfer means and the secondary transfer means can be prevented by differentiating the frequency of vibration caused by shock when the secondary transfer means comes in contact with the intermediate transfer belt from the frequency of the primary transfer means by setting the hardness of the secondary transfer roller 380 so that it is higher than the hardness of the primary transfer roller 320, the vibration of the intermediate transfer belt and the variation of the speed respectively caused by the contact and the non-contact of the secondary transfer means with the intermediate transfer belt, can be prevented. Particularly, to reduce time required between paper and another paper and speed up the output of an image by switching the state of the secondary transfer means from the non-contact state with the intermediate transfer belt to the contact state before primary transfer is finished and starting secondary transfer, the above is very effective. It is more effective to differentiate the hardness of all rollers arranged so that each roller is touched to the intermediate transfer belt. However, in the intermediate transfer unit, the quality of a toner image on the intermediate transfer belt or the quality of a toner image on a recording medium, is mainly determined by a contact state between the primary or secondary transfer means and the intermediate transfer belt in the primary or secondary transfer position. Thus, at least by constructing as in the embodiment of the present invention, a sufficient effect can be acquired by preventing vibration in the above transfer position.

Further, the vibration of the intermediate transfer belt can be further satisfactorily prevented by setting the hardness of the secondary transfer roller 380 so that it is higher than the hardness of the primary transfer roller 320 by 10 degrees or more.

Even if a belt with a joint is used for the intermediate transfer belt, vibration caused when the primary (or the secondary) transfer means passes on the joint in the primary (or the secondary) transfer position can be prevented from being resonated by the secondary (or the primary) transfer means by setting the hardness of the secondary transfer roller 380 so that it is higher than the hardness of the primary transfer roller 320 similarly.

The following modification is also possible.

<For Stabilizing the Efficiency of Primary Transfer>

(1) A high-voltage power source which has constant-current control when the impedance of primary transfer (the ratio of the output voltage and the output current of a power source for primary transfer not shown) is large (approximately 30 MΩ or more) and has constant-voltage control when the impedance is small (approximately 30 MΩ or less), is used. The above constant current is set to 15 μA and the above constant voltage is set to 450 V.

Hereby, even if there is dispersion in the quantity (film thickness) of toner, environment, and the resistance of a member, satisfactory transfer is executed as shown in Table 1.

For comparison, Table 2 shows the result when simple constant-current control (set to 15 μA) is executed and Table 3 shows the result when simple constant-voltage control (set to 450 V) is executed.

TABLE 1

| Temperature, humidity & environment | Printing pattern | Resistance of primary transfer roller | Output current | Output voltage | Result |
|---|---|---|---|---|---|
| 10° C. 15% RH | Printing ratio 10% | $1 \times 10^7$ Ω | 15 μA | 700 V | ○ |
| 10° C. 15% RH | Printing ratio 200% Solid two-color overlapped image | $1 \times 10^7$ Ω | 15 μA | 1000 V | ○ |

TABLE 1-continued

| Temperature, humidity & environment | Printing pattern | Resistance of primary transfer roller | Output current | Output voltage | Result |
|---|---|---|---|---|---|
| 23° C. 65% RH | Printing ratio 10% | $5 \times 10^6$ Ω | 30 μA | 450 V | ○ |
| 23° C. 65% RH | Printing ratio 200% Solid two-color overlapped image | $5 \times 10^6$ Ω | 15 μA | 800 V | ○ |
| 35° C. 65% RH | Printing ratio 10% | $3 \times 10^6$ Ω | 45 μA | 450 V | ○ |
| 35° C. 65% RH | Printing ratio 200% Solid two-color overlapped image | $3 \times 10^6$ Ω | 15 μA | 600 V | ○ |

TABLE 2

| Temperature, humidity & environment | Printing pattern | Resistance of primary transfer roller | Output current | Output voltage | Result |
|---|---|---|---|---|---|
| 10° C. 15% RH | Printing ratio 10% | $1 \times 10^7$ Ω | 15 μA | 700 V | ○ |
| 10° C. 15% RH | Printing ratio 200% Solid two-color overlapped image | $1 \times 10^7$ Ω | 15 μA | 1000 V | ○ |
| 23° C. 65% RH | Printing ratio 10% | $5 \times 10^6$ Ω | 15 μA | 300 V | Δ |
| 23° C. 65% RH | Printing ratio 200% Solid two-color overlapped image | $5 \times 10^6$ Ω | 15 μA | 800 V | ○ |
| 35° C. 65% RH | Printing ratio 10% | $3 \times 10^6$ Ω | 15 μA | 150 V | x |
| 35° C. 65% RH | Printing ratio 200% Solid two-color overlapped image | $3 \times 10^6$ Ω | 15 μA | 600 V | ○ |

TABLE 3

| Temperature, humidity & environment | Printing pattern | Resistance of primary transfer roller | Output current | Output voltage | Result |
|---|---|---|---|---|---|
| 10° C. 15% RH | Printing ratio 10% | $1 \times 10^7$ Ω | 10 μA | 450 V | Δ |
| 10° C. 15% RH | Printing ratio 200% Solid two-color overlapped image | $1 \times 10^7$ Ω | 3 μA | 450 V | x |
| 23° C. 65% RH | Printing ratio 10% | $5 \times 10^6$ Ω | 30 μA | 450 V | ○ |

TABLE 3-continued

| Temperature, humidity & environment | Printing pattern | Resistance of primary transfer roller | Output current | Output voltage | Result |
|---|---|---|---|---|---|
| 23° C. 65% RH | Printing ratio 200% Solid two-color overlapped image | 5 × $10^6$ Ω | 7 μA | 450 V | x |
| 35° C. 65% RH | Printing ratio 10% | 3 × $10^6$ Ω | 45 μA | 450 V | ○ |
| 35° C. 65% RH | Printing ratio 200% Solid two-color overlapped image | 3 × $10^6$ Ω | 10 μA | 450 V | Δ |

(2) The surface resistivity of the intermediate transfer belt 360 is set to $10^8$ to $10^{12}$ Ω/□, and the volume resistivity is set to $10^8$ to $10^{12}$ Ωcm.

The primary transfer roller 320 is a roller with the outer diameter of 22 mm and the width of 358 mm on a shaft 12 mm in diameter. It is made of urethane in which carbon is dispersed, the resistance is set to $10^6$ to $10^8$ Ω (desirably approximately $10^7$ Ω), the hardness is set to 45±5°, and a load onto the photoconductive drum 110 by the primary transfer roller is set to 1.0 to 3.5 kg. (desirably approximately 2.5 kg). That is, the above load is set to 28 to 98 g/cm (desirably approximately 70 g/cm).

Transfer is enabled at the relatively low voltage of 1200 V or less by setting the resistance value to the above range.

The occurrence of a so-called void can be prevented by setting the hardness and the load to the above range.

(3) For the quantity of a used additive to toner, the quantity of an additive with a large particle diameter (the primary particle diameter of 40 nm) is set to 0.5 to 4.0 wt % (desirably approximately 0.7 wt %) and the quantity of an additive with a small particle diameter (the primary particle diameter of 14 nm) is set to 1.5 to 4.0 wt % (desirably approximately, 2.0 wt %).

The additive with a large particle diameter is mainly required to enhance the durable stability (the stability of the density) of toner and in view of the above, the more the quantity of the above additive is, the better it is. However, if the quantity of the above additive exceeds 4.0 wt %, the fluidity of toner is deteriorated. Thus, the too much quantity of the above additive causes the occurrence of a void and others and is not desirable.

In the meantime, the additive with a small particle diameter is mainly required to enhance transferability on rough paper and in view of the above, the more the quantity of the above additive is, the better it is. However, if the quantity of the above additive exceeds 4.0 wt %, the photoconductive drum 110 and the intermediate transfer belt 360 are readily filmed with floating silica so that it is not desirable.

<For the Stabilization of Secondary Transfer Efficiency>

(1) A high-voltage power source which has constant-current control when the impedance of secondary transfer (the ratio of the output voltage and the output current of a power source for secondary transfer not shown) is large (approximately 20 MΩ or more) and has constant-voltage control when the impedance is small (approximately 20 MΩ or less), is used. The constant current is set to 30 μA and the constant voltage is set to 600 V.

Hereby, even if there is dispersion in the type of paper, environment, and the resistance of a member, transfer is satisfactorily executed.

(2) The surface resistivity of the intermediate transfer belt 360 is set to $10^8$ to $10^{12}$ Ω/□, and the volume resistivity is set to $10^8$ to $10^{12}$ Ωcm.

The secondary transfer roller 380 is a roller with the outer diameter of 25 mm and the width of 332 mm on a shaft 15 mm in diameter. Ion conductive material such as lithium perchlorate is applied to the secondary transfer roller, the resistance is set to $10^6$ to $10^8$ Ω, the hardness is set to 60+5°, and a load onto the backup roller 350 by the secondary transfer roller is set to 5.0 to 9.0 kg (desirably approximately 7.0 kg). That is, the above load is set to 150 to 270 g/cm (desirably approximately 210 g/cm).

Transfer is enabled at 4000 V or less and 200 μA or less by setting the resistance to the above range.

The backup roller 350 is grounded.

(3) For the quantity of a used additive to toner, the quantity of an additive with a large particle diameter is set to 0.5 to 4.0 wt % (desirably approximately 0.7 wt %) and the quantity of an additive with a small particle diameter is set to 1.5 to 4.0 wt % (desirably approximately 2.0 wt %).

The reason is as described above.

According to the above conditions, the deterioration of an image due to interference in simultaneous primary and secondary transfer can be prevented and the capacity of the high-voltage power source can be reduced to the minimum.

As described above, according to the intermediate transfer unit of the present invention, satisfactory transferability can be secured without depending upon a printing pattern because the control of the high-voltage power source is optimized.

Also, transfer is enabled at required and minimum voltage and current and an imperfect image can be prevented from occurring due to abnormal discharge and others because the resistance of the primary transfer member and the intermediate transfer belt is optimized.

Also, the dislocation of images in primary transfer can be prevented and a phenomenon of a void can be prevented from occurring because the hardness of the primary transfer member and a load onto the photoconductive drum by the primary transfer member are optimized.

Also, the phenomenon of a void can be prevented from occurring because the quantity of an additive with a small particle diameter of additives added to toner is optimized and the deterioration of density due to aging can be prevented because the quantity of an additive with a large particle diameter is optimized.

The following modification is also possible.

<For the Stabilization of Secondary Transfer Efficiency>

(1) A high-voltage power source which has constant-current control when the impedance of secondary transfer the ratio of the output voltage and the output current of a power source for secondary transfer not shown) is large (approximately 20 MΩ or more) and has constant-voltage control when the impedance is small (approximately 20 MΩ or less), is used. The constant current is set to 30 μA and the constant voltage is set to 600 V.

Hereby, as shown in Table 4, even if there is dispersion in the type of paper, environment, and the resistance of a member, transfer is satisfactorily executed. For comparison, Table 5 shows the result in simple constant-current control (current is set to 30 $\mu$A) and Table 6 shows the result in simple constant-voltage control (voltage is set to 600 V).

TABLE 4

| Temperature, Humidity, Environment | Type of recording medium | Resistance of secondary transfer roller | Output current | Output voltage | Result |
|---|---|---|---|---|---|
| 10° C. 15% RH | OHP sheet | $3 \times 10^7$ Ω | 30 $\mu$A | 3000 V | ○ |
| 10° C. 15% RH | Xerox 4024 | $3 \times 10^7$ Ω | 30 $\mu$A | 2500 V | ○ |
| 23° C. 65% RH | Xerox 4024 | $5 \times 10^6$ Ω | 30 $\mu$A | 800 V | ○ |
| 23° C. 65% RH | Postal card | $5 \times 10^6$ Ω | 60 $\mu$A | 600 V | ○ |
| 35° C. 65% RH | OHP sheet | $1 \times 10^6$ Ω | 30 $\mu$A | 1200 V | ○ |
| 35° C. 65% RH | Xerox 4024 | $1 \times 10^6$ Ω | 150 $\mu$A | 600 V | ○ |

TABLE 5

| Temperature, Humidity, Environment | Type of recording medium | Resistance of secondary transfer roller | Output current | Output voltage | Result |
|---|---|---|---|---|---|
| 10° C. 15% RH | OHP sheet | $3 \times 10^7$ Ω | 30 $\mu$A | 3000 V | ○ |
| 10° C. 15% RH | Xerox 4024 | $3 \times 10^7$ Ω | 30 $\mu$A | 2500 V | ○ |
| 23° C. 65% RH | Xerox 4024 | $5 \times 10^6$ Ω | 30 $\mu$A | 800 V | ○ |
| 23° C. 65% RH | Postal card | $5 \times 10^6$ Ω | 30 $\mu$A | 300 V | x |
| 35° C. 65% RH | OHP sheet | $1 \times 10^6$ Ω | 30 $\mu$A | 1200 V | ○ |
| 35° C. 65% RH | Xerox 4024 | $1 \times 10^6$ Ω | 30 $\mu$A | 100 V | x |

TABLE 6

| Temperature, humidity, Environment | Type of recording medium | Resistance of secondary transfer roller | Output current | Output voltage | Result |
|---|---|---|---|---|---|
| 10° C. 15% RH | OHP sheet | $3 \times 10^7$ Ω | 5 $\mu$A | 600 V | x |
| 10° C. 15% RH | Xerox 4024 | $3 \times 10^7$ Ω | 10 $\mu$A | 600 V | x |
| 23° C. 65% RH | Xerox 4024 | $5 \times 10^6$ Ω | 24 $\mu$A | 600 V | Δ |
| 23° C. 65% RH | Postal card | $5 \times 10^6$ Ω | 60 $\mu$A | 600 V | ○ |
| 35° C. 65% RH | OHP sheet | $1 \times 10^6$ Ω | 15 $\mu$A | 600 V | x |
| 35° C. 65% RH | Xerox 4024 | $1 \times 10^6$ Ω | 150 $\mu$A | 600 V | ○ |

According to the intermediate transfer unit of the present invention, satisfactory transferability can be secured without being influenced by the type of a recording medium and environment because the control of the high-voltage power source is optimized.

Also, transfer is enabled at required and minimum voltage and current, and an imperfect image can be prevented from occurring due to abnormal discharge and others because the resistance of the secondary transfer member and the intermediate transfer belt is optimized.

Also, dislocation between images in secondary transfer can be prevented and satisfactory transfer is also enabled onto a recording medium the surface of which is rough, such as bond paper, because the hardness of the secondary transfer member and a load onto the backup roller by the secondary transfer member are optimized.

Also, the phenomenon of a void can be prevented from occurring because the quantity of an additive with a small particle diameter of two types of additives added to toner and different in a particle diameter is optimized and fluidity is secured, and the deterioration of density due to aging can be prevented because the quantity of an additive with a large particle diameter is optimized.

The following modification is also possible.

<For the Stabilization of Secondary Transfer Efficiency>

(1) A high-voltage power source which has constant-current control when the impedance of secondary transfer (the ratio of the output voltage and the output current of a power source for secondary transfer not shown) is large (approximately 20 MΩ or more), and has constant-voltage control when the impedance is small (approximately 20 MΩ or less), is used. The constant current is set to 30 $\mu$A and the constant voltage is set to 600 V.

Hereby, even if there is dispersion in the type of paper, environment, and the resistance of a member, transfer is satisfactorily executed.

(2) The surface resistivity of the intermediate transfer belt 360 is set to $10^8$ to $10^{12}$ $\Omega/\square$, and the volume resistivity is set to $10^6$ to $10^{12}$ Ωcm.

The secondary transfer roller 380 is a roller with the outer diameter of 25 mm and the width of 332 mm on a shaft 15 mm in diameter. Ion conductive material such as lithium perchlorate is applied to the secondary transfer roller, the resistance is set to $3\times10^7$ to $1\times10^8$ Ω in the environment of low temperature and low humidity, and set to $1\times10^6$ to $1\times10^7$ Ω in the environment of high temperature and high humidity, the hardness is set to 60±5°, and a load onto the backup roller 350 by the secondary transfer roller is set to 5.0 to 9.0 kg (desirably approximately 7.0 kg). That is, the above load is set to 150 to 270 g/cm (desirably approximately 210 g/cm).

Transfer is enabled at 4000 V or less and 200 $\mu$A or less by setting the resistance to the above range.

The backup roller 350 is grounded.

(3) For the quantity of a used additive to toner, the quantity of an additive with a large particle diameter is set to 0.5 to 4.0 wt % (desirably approximately 0.7 wt %), and the quantity of an additive with a small particle diameter is set to 1.5 to 4.0 wt % (desirably approximately 2.0 wt %).

The reason is as described above.

Table 7 shows an example of an experiment of the above primary transfer part and secondary transfer part.

TABLE 7

| Experiment No. | Temp., Humidity, Environment | Resistance of primary transfer roller | Primary transfer output Maximum current | Primary transfer output Maximum voltage | Resistance of secondary transfer roller | Secondary transfer result | Variation of resistance due to environment (digit) Primary transfer roller | Variation of resistance due to environment of resistance (digit) Secondary transfer roller |
|---|---|---|---|---|---|---|---|---|
| 1 | 10° C., 15%, RH | $1 \times 10^7$ Ω | 60 (μA) | 1200 (V) | $3 \times 10^7$ Ω | Good in any paper type | 0.5 | 1.5 |
| 1 | 35° C., 65%, RH | $3 \times 10^6$ Ω | 60 (μA) | 1200 (V) | $1 \times 10^6$ Ω | Good in any paper type | 0.5 | 1.5 |
| 2 | 10° C., 15%, RH | $3 \times 10^7$ Ω | 150 (μA) | 3000 (V) | $1 \times 10^7$ Ω | * | 1.5 | 0.5 |
| 2 | 35 ° C., 65%, RH | $1 \times 10^6$ Ω | 150 (μA) | 3000 (V) | $3 \times 10^6$ Ω | * | 1.5 | 0.5 |

'*' failure of paper transferring in small size occurs in the environment of 10° C., 15%, RH.

As shown in the experiment No. 1, satisfactory secondary transferability and the reduction of the capacity of the primary transfer power source can be realized by using a member having small variation of resistance due to environment for the primary transfer roller and using a member having large variation of resistance due to environment for the secondary transfer roller.

According to the intermediate transfer unit of the invention, since the change of the resistance of the primary transfer member and the secondary transfer member due to environment is optimized, the capacity of the primary transfer power source can be reduced and no failure of transfer in the secondary transfer part occurs both in the environment of low temperature and low humidity and in the environment of high temperature and high humidity.

Figure 7:
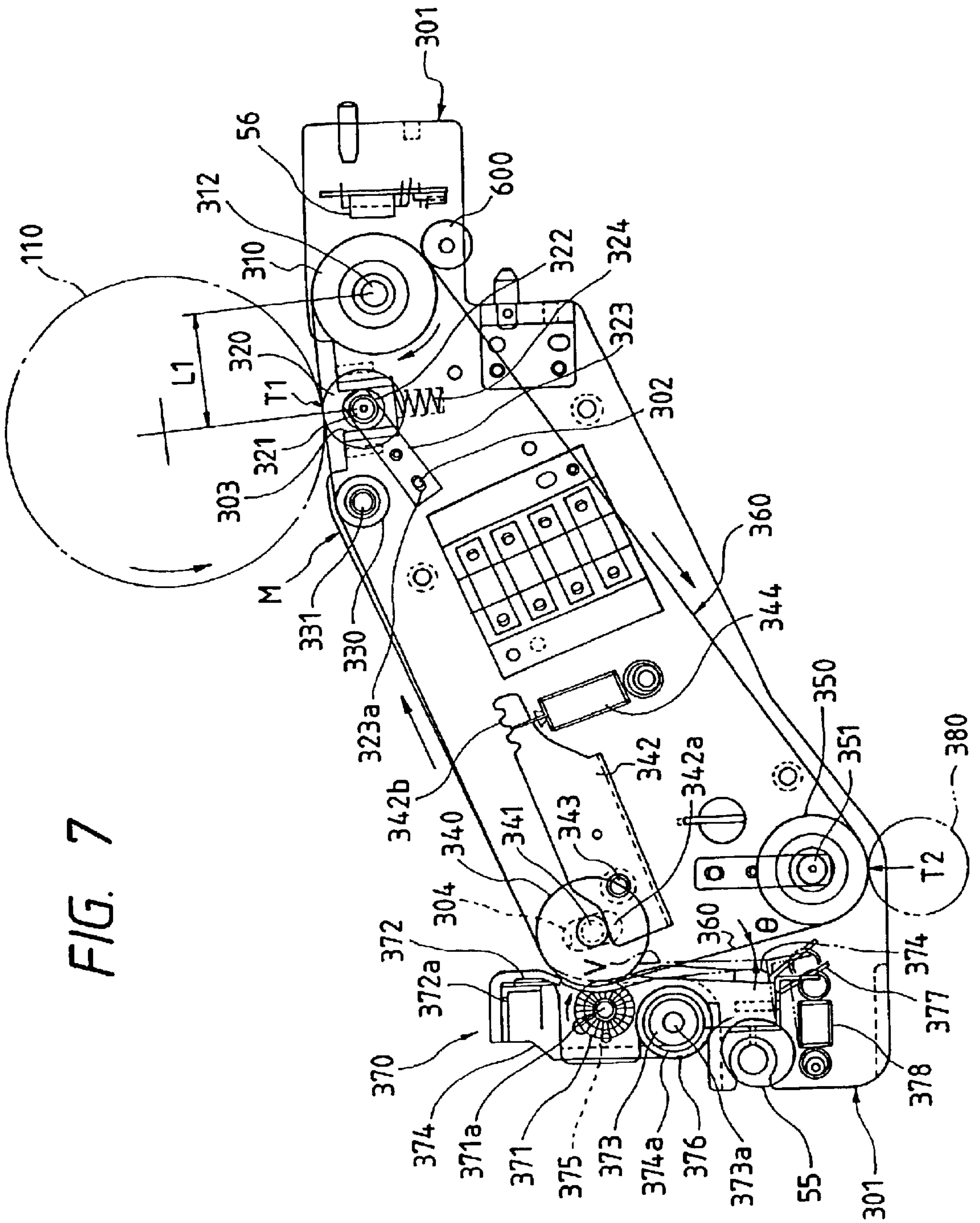
FIG. 7 is a side view omitting a part mainly showing an intermediate transfer unit of an embodiment.

FIG. 7 is a side view showing a modification of the intermediate transfer unit 300.

In this modification, the intermediate transfer unit 300 is provided with a roller electrode 600 which is an example of the primary transfer member. Other portions in this intermediate transfer unit are the same as those in FIG. 4.

The roller electrode 600 is a conductive elastic member approximately 10 mm in diameter and 5 mm in width, is located at the end of the intermediate transfer belt 360, and is lightly in contact with the belt. Voltage is supplied to the roller electrode 600 from a not-shown high-voltage power source for primary transfer.

Figure 8:
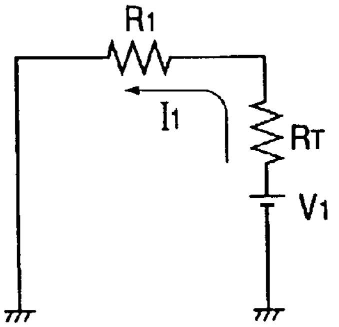
FIG. 8 explains the function of an embodiment of the present invention.

FIG. 8 shows an equivalent circuit in primary transfer. 'V1' denotes the voltage of a primary transfer power source, 'R1' denotes apparent resistance generated when a charged photoconductive drum, an intermediate transfer belt provided with a resistance layer, etc. are rotated or circulated, '$R_T$' denotes the resistance of a primary transfer member and contact resistance, and 'I1' denotes current for enabling primary transfer (current required for primary transfer).

Figure 9:
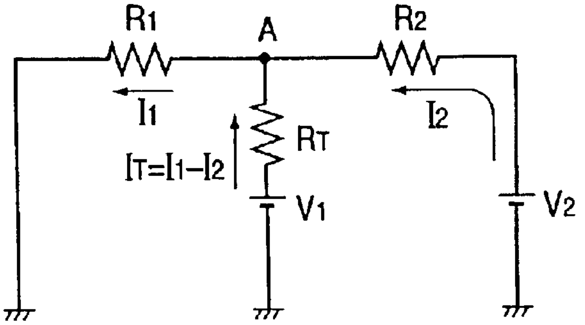
FIG. 9 explains the function of an embodiment of the present invention.

FIG. 9 shows an equivalent circuit in case primary transfer and secondary transfer are simultaneously executed. 'V2' denotes the voltage of a secondary transfer power source, 'R2' denotes apparent resistance generated by a secondary transfer member and a recording medium, and 'I2' denotes current for enabling secondary transfer (current required for secondary transfer). It is electric potential at a point A that is important in FIG. 9. When this electric potential greatly varies, the point A is out of a suitable transfer electric field and primary transfer fails. To prevent the above failure, 'I2' is set so that it flows on the side of the primary transfer power source by setting so that $R_T$<R1. Concretely, the resistance of the primary transfer member is set to 1 MΩ or less.

If the relationship of "I1>I2" is met under the above conditions, the failure of transfer in primary and secondary simultaneous transfer is prevented.

However, depending upon an environmental-condition and the type of a recording medium, I1 is smaller than I2. In this case, since current cannot be supplied from the primary transfer power source, electric potential at the point A is increased and transfer failure occurs.

'$I_T$' denotes the current of the primary transfer power source and under the above condition, it can be shown by an expression, $I_T$=I1−I2. Therefore, under the condition of "I1<I2", the current $I_T$ of the primary transfer power source requires a function (a current absorbing function) for outputting negative current while outputting positive voltage.

Figure 10:
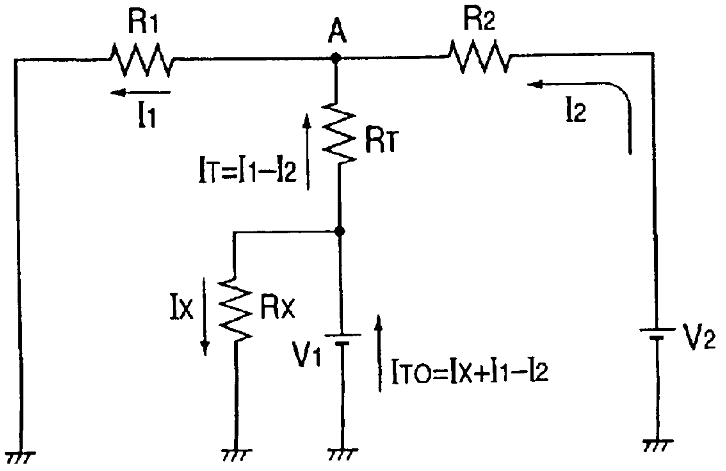
FIG. 10 explains the function of an embodiment of the present invention.

FIG. 10 shows a case that a resistor Rx is connected in parallel to the high-voltage power source. Primary transfer power source current $I_{T0}$ can be expressed by an expression "$I_{T0}$=Ix+(I1−I2)" using current Ix which flows in the resistor Rx, and the above currents I1 and I2. Therefore, since $I_{T0}$ is positive even if "I1−I2<0", electric potential at the point A can be kept.

The following modification is also possible.

The following is related to mainly a transfer process.

(1) The intermediate transfer belt 360 without an end is formed by coating a sheet-shaped PET in which aluminum is deposited, with urethane paint in which PEFT particles and tin oxide as conductive material are dispersed, and by bonding both ends by ultrasonic welding.

Difference in a level made by bonding both ends is set to 50 μm or less and desirably set to 30 μm or less. Young's modulus of the paint is set to approximately $1.5\times10^4$ kgf/cm$^2$. The surface resistivity of the paint is set to approximately $10^8$ to $10^{12}$ Ω/□, and the surface roughness is set to Rmax 1 μm (desirably 0.7 mm) or less. For the constitution of an electrode, a conductive layer is printed on the surface of aluminum at an end, and bias is applied by the roller electrode 600 (1 MΩ or less). The primary transfer member may be also a brush, a blade, and the like except the roller electrode in this embodiment. It is important that the resistance of the primary transfer member is 1 MΩ or less.

The efficiency of transfer and the facility of cleaning can be enhanced by setting as described above.

(2) The high-voltage power source has current absorption type constant-voltage control in the primary transfer part, and applies primary transfer voltage until secondary transfer is finished.

The primary transfer roller (the primary transfer backup roller) functions only as a backup roller.

Even if secondary transfer current is larger than primary transfer current, the deterioration of the quality of an image due to interference in simultaneous primary and secondary transfer can be avoided by constituting an electrode and a power source as described above.

Table 8 shows the result of the above experiment.

Since the primary transfer roller (primary transfer backup roller) 320 and the used additive to toner are the same as those in the previously described embodiment, the description thereof will be omitted.

Further, the following modification is also possible.

The following description is mainly related to a transfer process:

(1) The intermediate transfer belt 360 without an end is formed by coating a sheet-shaped PET in which aluminum is deposited, with urethane paint in which PEFT particles and tin oxide as conductive material are dispersed, and by bonding both ends by ultrasonic welding.

Difference in a level made by bonding both ends is set to 50 μm or less and desirably set to 30 μm or less. Young's modulus of the paint is set to approximately $1.5\times10^4$ kgf/cm$^2$. The surface resistivity of the paint is set to approximately $10^8$ to $10^{12}$ Ω/□, and the surface roughness is set to Rmax 1 μm (desirably 0.7 μm) or less. For the constitution of an electrode, a conductive layer is printed on the surface of aluminum at an end, and bias is applied by the roller electrode 600 (1 MΩ or less). The primary transfer member may be also a brush, a blade, etc. except the roller electrode in this embodiment. It is important that the resistance of the primary transfer member is 1 MΩ or less.

The efficiency of transfer and the facility of cleaning can be enhanced by setting as described above.

TABLE 8

| Temp., Humidity, Environment | Type of recording medium | Primary transfer output current | Secondary transfer output current | Image quality deteriorationin at simultaneous transfer This embodiment | Image quality deteriorationin at simultaneous transfer Comparison example |
|---|---|---|---|---|---|
| 10° C., 15%, RH | OHP sheet | 20 μA | 30 μA | ○ | Δ |
| 10° C., 15%, RH | Xerox 4024 | 20 μA | 30 μA | ○ | Δ |
| 23° C., 65%, RH | Xerox 4024 | 35 μA | 30 μA | ○ | ○ |
| 23° C., 65%, RH | Postal card | 35 μA | 60 μA | ○ | x |
| 35° C., 65%, RH | OHP sheet | 50 μA | 30 μA | ○ | ○ |
| 35° C., 65%, RH | Xerox 4024 | 50 μA | 150 μA | ○ | x |

○: No image quality deterioration

Δ: Change is seen, however, within allowable level x: Remarkable image quality deterioration Difference between the comparison example and this embodiment is only difference made by the high-voltage power source.

Heretofore, when a secondary transfer current value is larger by 10 μA or more than a primary transfer current value, the remarkable deterioration of the quality of an image occurs. However, according to the present invention, a high quality of image can be acquired independent of environment and the type of paper.

<For Stabilizing the Efficiency of Primary Transfer>

(1) The primary transfer high-voltage power source is set to 500 V. Current which flows during primary transfer is approximately 20 to 50 μA.

(2) A resistor 5 MΩ is connected in parallel to the primary transfer high-voltage power source for constant-voltage control. The primary transfer high-voltage power source applies primary transfer voltage until secondary transfer is finished.

The primary transfer roller (primary transfer backup roller) functions only as a backup roller.

Even if secondary transfer current is larger than primary transfer current, the deterioration of an image due to interference in simultaneous primary and secondary transfer can be avoided by constructing an electrode and a power source as described above.

Table 9 shows the result of the above experiment.

TABLE 9

| Temp., Humidity, Environment | Type of recording medium | Primary transfer current I1 | Secondary transfer current I2 | Image quality deterioration- at simultaneous transfer This embodiment | Image quality deterioration at simultaneous transfer Comparison example |
|---|---|---|---|---|---|
| 10° C., 15%, RH | OHP sheet | 20 μA | 30 μA | ○ | Δ |
| 10° C., 15%, RH | Xerox 4024 | 20 μA | 30 μA | ○ | Δ |
| 23° C., 65%, RH | Xerox 4024 | 35 μA | 30 μA | ○ | ○ |
| 23° C., 65%, RH | Postal card | 35 μA | 60 μA | ○ | x |
| 35° C., 65%, RH | OHP sheet | 50 μA | 30 μA | ○ | ○ |
| 35° C., 65%, RH | Xerox 4024 | 50 μA | 150 μA | ○ | x |

○: No image quality deterioration
Δ: Change is seen, however, within allowable level
x: Remarkable image quality deterioration Difference between the comparison example and this embodiment depends upon only whether a resistor is connected in parallel to the high-voltage power source or not.

The characters I1 and I2 in the table are the same as described before.

Heretofore, when a secondary transfer current value is larger by 10 μA or more than a primary transfer current value, the remarkable deterioration of the quality of an image occurs. However, according to the present invention, a high quality of image can be acquired independent of environment and the type of paper.

According to the intermediate transfer unit of the invention, since the control of the high-voltage power source is optimized and the resistance of the primary transfer member is optimized, the deterioration of the quality of an image in simultaneous primary and secondary transfer can be inhibited independent of environment and the type of paper.

What is claimed is:

1. An intermediate transfer unit, comprising:
- a photoconductive drum;
- an intermediate transfer belt;
- an elastic primary transfer member, which primarily transfers a toner image formed on the photo conductive drum onto the intermediate transfer belt, at a primary transfer position, the primary transfer member having a resistance value of 1 MΩ or less, and serving as a backup roller for the primary transfer position;
- a secondary transfer member, which secondarily transfers the toner image from the intermediate transfer belt to a recording medium;
- a high-voltage power source, which applies bias to the primary transfer member under a current absorbable constant-voltage control.

2. The intermediate transfer unit according to claim 1, further comprising a resistor connected in parallel to the high-voltage power source.

* * * * *